(12) United States Patent
Hayashi et al.

(10) Patent No.: US 6,889,495 B2
(45) Date of Patent: May 10, 2005

(54) GAS TURBINE COMBUSTOR

(75) Inventors: Shigeru Hayashi, Tokyo (JP); Hideshi Yamada, Tokyo (JP)

(73) Assignee: National Aerospace Laboratory of Japan, Tokyo (JP)

( * ) Notice: Subject to any disclaimer, the term of this patent is extended or adjusted under 35 U.S.C. 154(b) by 68 days.

(21) Appl. No.: 10/382,877

(22) Filed: Mar. 7, 2003

(65) Prior Publication Data

US 2003/0167771 A1 Sep. 11, 2003

(30) Foreign Application Priority Data

Mar. 8, 2002 (JP) ........................................ 2002-064302

(51) Int. Cl.[7] ............................................... F23R 3/30
(52) U.S. Cl. ...................................... 60/39.37; 60/737
(58) Field of Search ............................... 60/39.37, 737, 60/738, 746

(56) References Cited

U.S. PATENT DOCUMENTS 3,792,582 A * 2/1974 Markowski ................... 60/737
5,274,993 A * 1/1994 Keller ......................... 60/39.37
5,323,614 A * 6/1994 Tsukahara ..................... 60/737

FOREIGN PATENT DOCUMENTS

JP 8-42851 2/1996

* cited by examiner

Primary Examiner—Louis J. Casaregola
(74) Attorney, Agent, or Firm—Westerman Hattori Daniels & Adrian, LLP

(57) ABSTRACT

The present invention provides a gas turbine combustor which makes it possible to achieve both a high combustion efficiency and low NOx emissions characteristics over a wide output power range without using a device that can vary the flow rate of the air used for combustion, by burning a lean mixture using high-temperature burned gas. The gas turbine combustor 10 comprises pre-mixture injection tubes 16 which conduct a mixture of fuel and air into a combustion chamber 11. The mixture from the pre-mixture injection tubes 16 is injected toward burned gas 19a present on the downstream side of the flame 19, which is injected from burners 15 that open into the combustion chamber 11, and this mixture is mixed with the burned gas 19a. Even in a mixture which is leaner than the lower limit of inflammability, the radicals in the burned gas 19a are effective in initiating reactions, so that the combustion of the mixture can be started. Since the burned gas has a lower oxygen concentration than fresh mixture, and since the pre-mixture is dispersed in space, the generation of NOx can be suppressed.

11 Claims, 13 Drawing Sheets

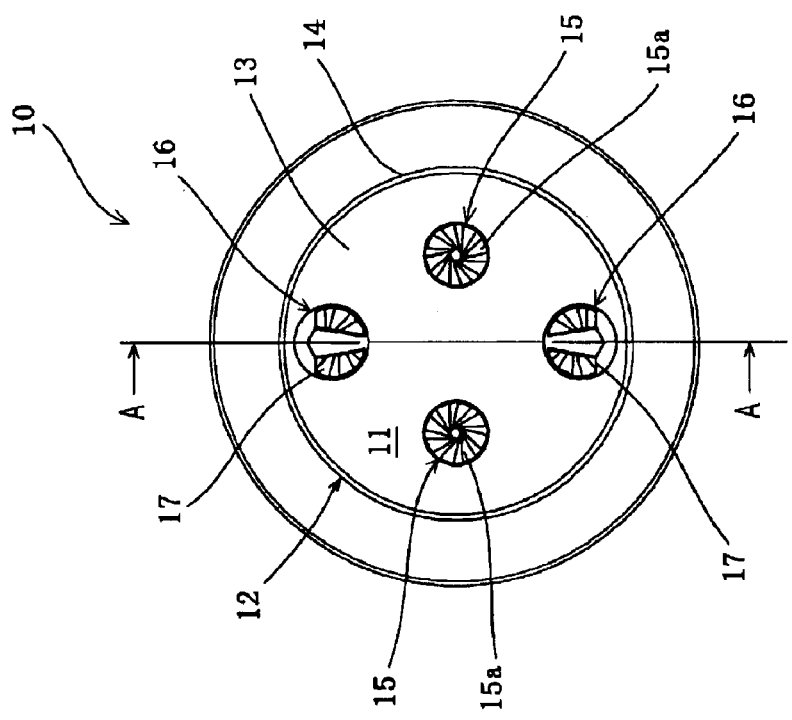
FIG. 1-B
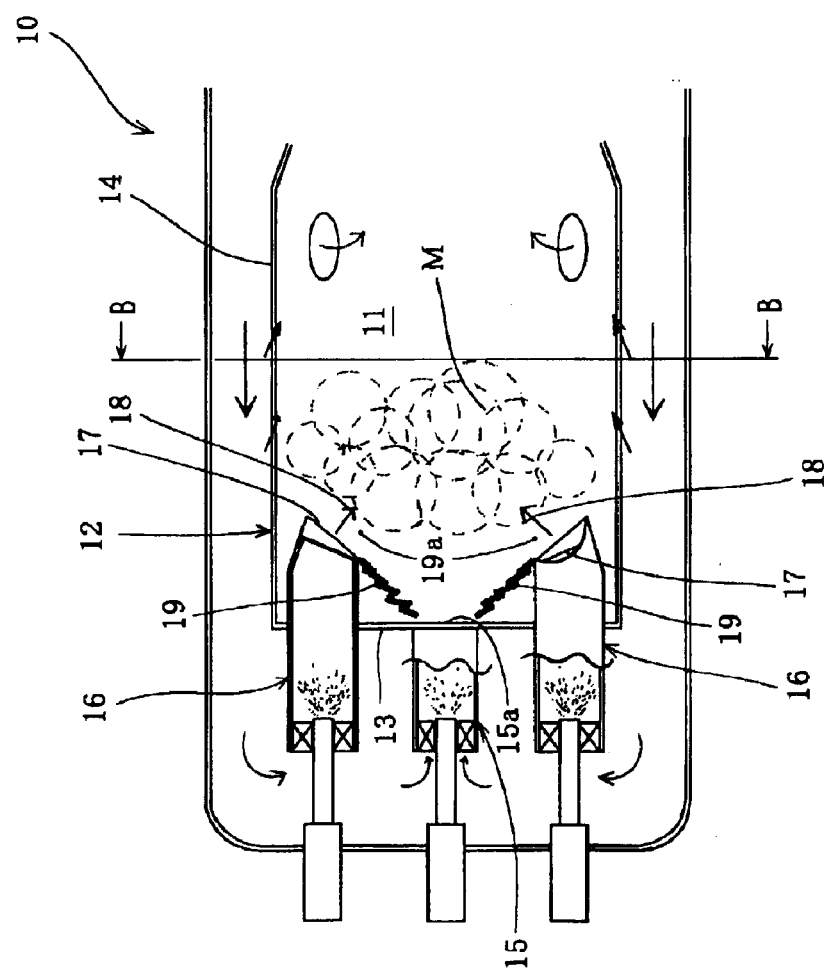
FIG. 1-A

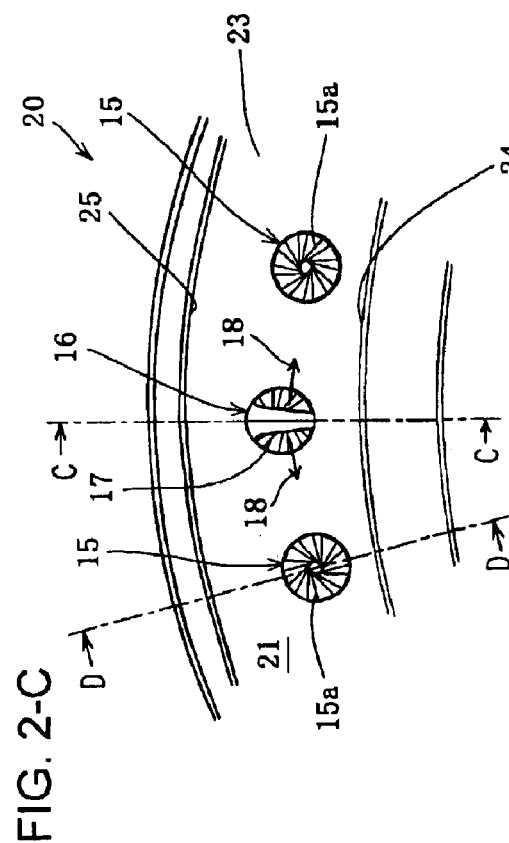
FIG. 2-C
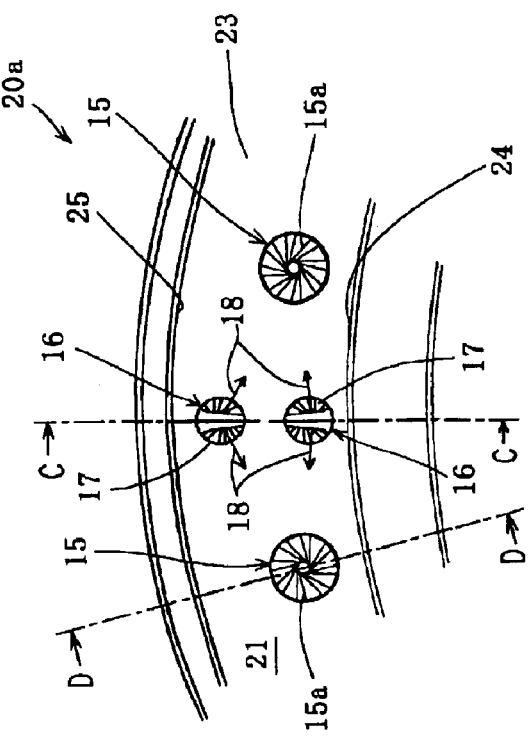
FIG. 2-D
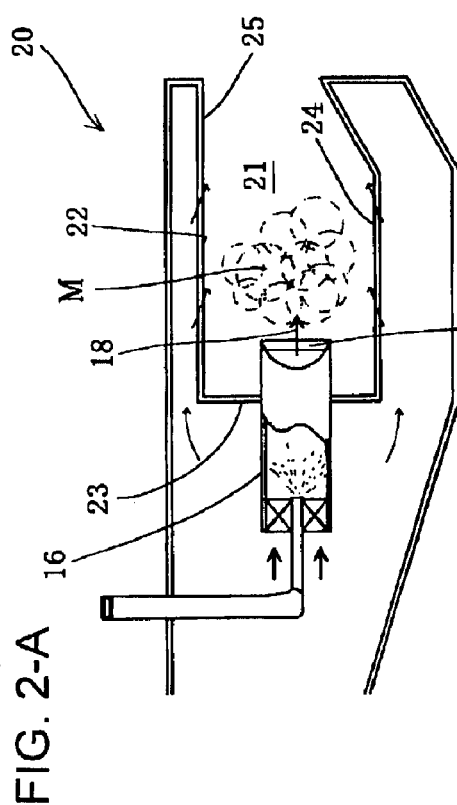
FIG. 2-A
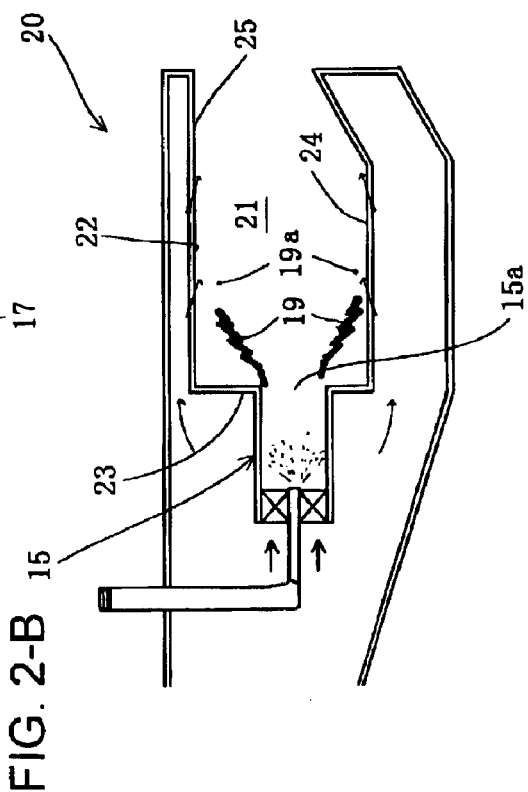
FIG. 2-B

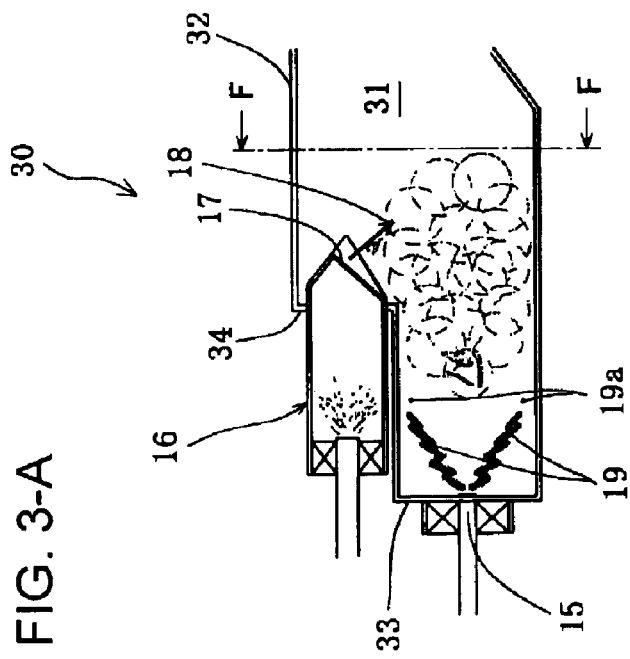
FIG. 3-A
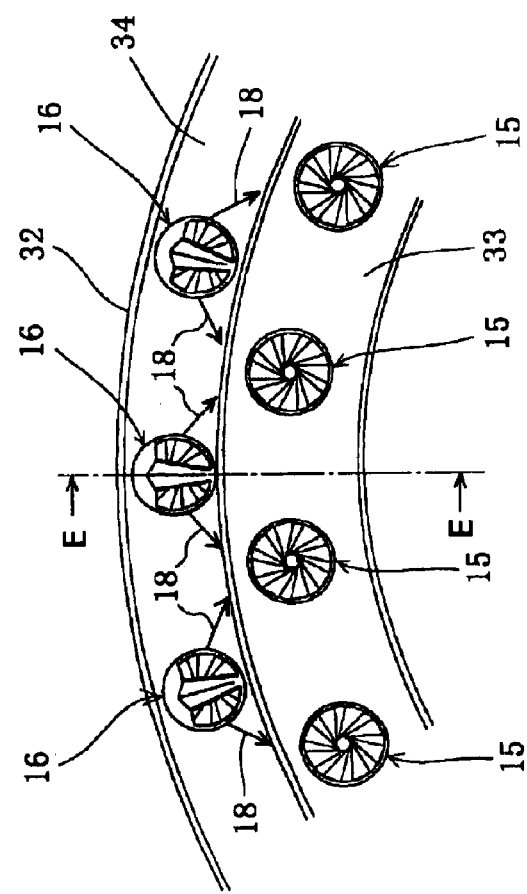
FIG. 3-B

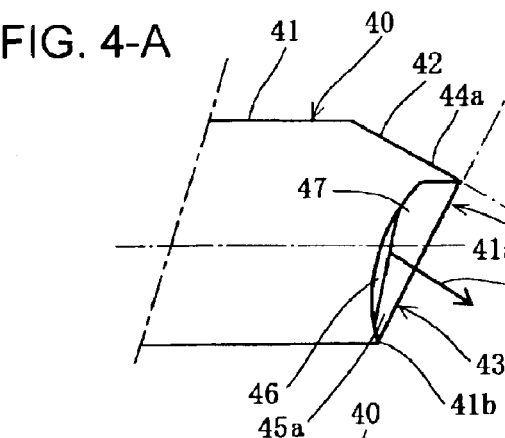
FIG. 4-A
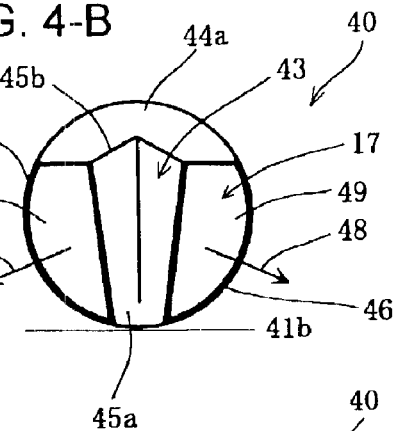
FIG. 4-B
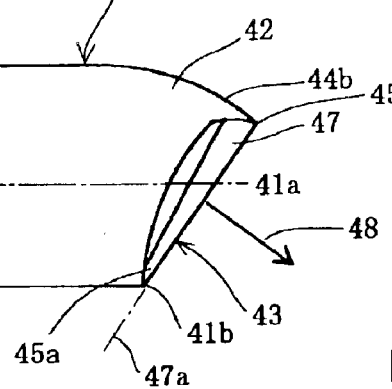
FIG. 4-C
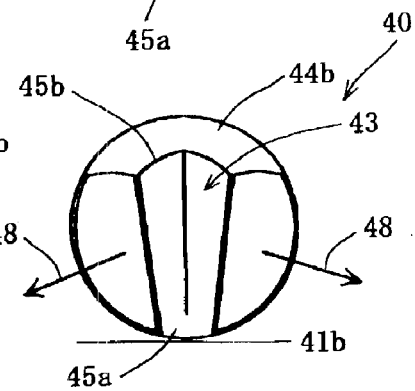
FIG. 4-D
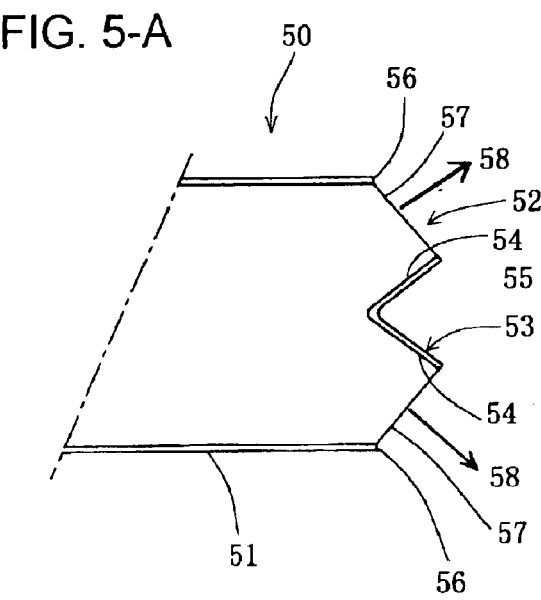
FIG. 5-A
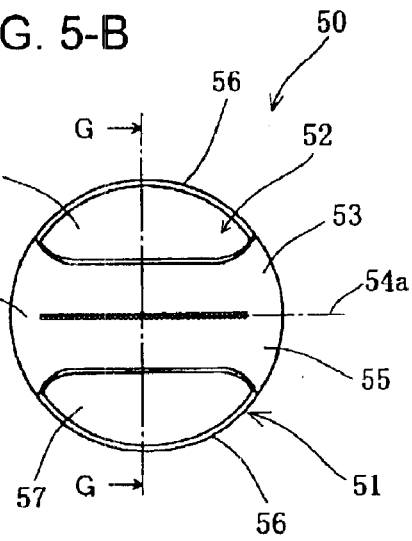
FIG. 5-B FIG. 6-A
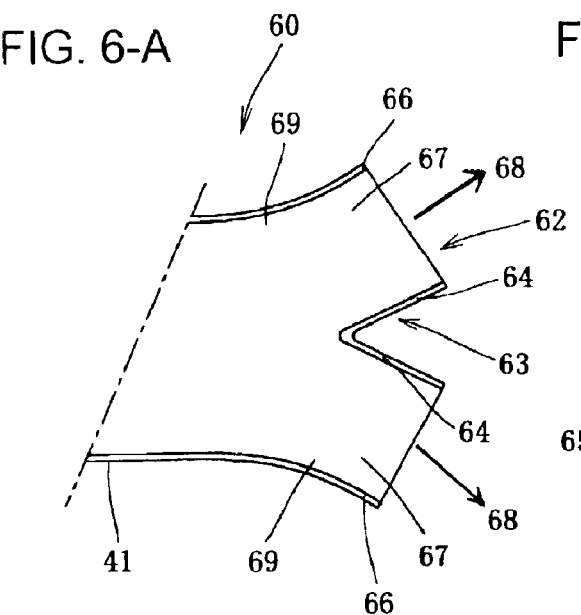
FIG. 6-B
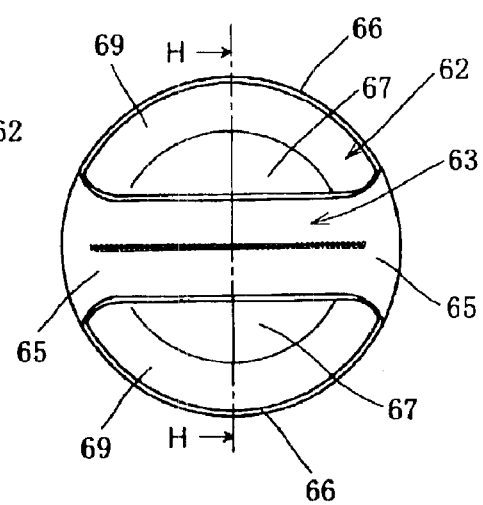
FIG. 7-A
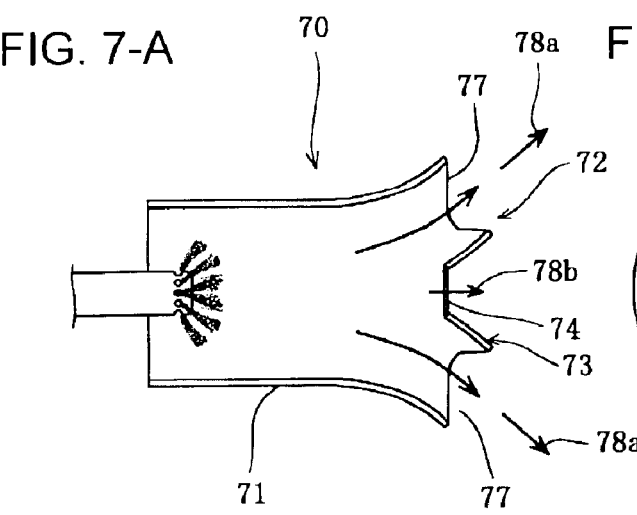
FIG. 7-B
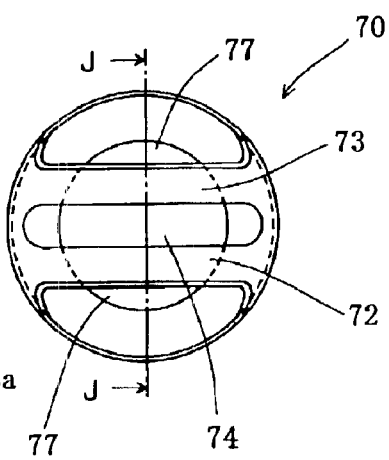

FIG. 8
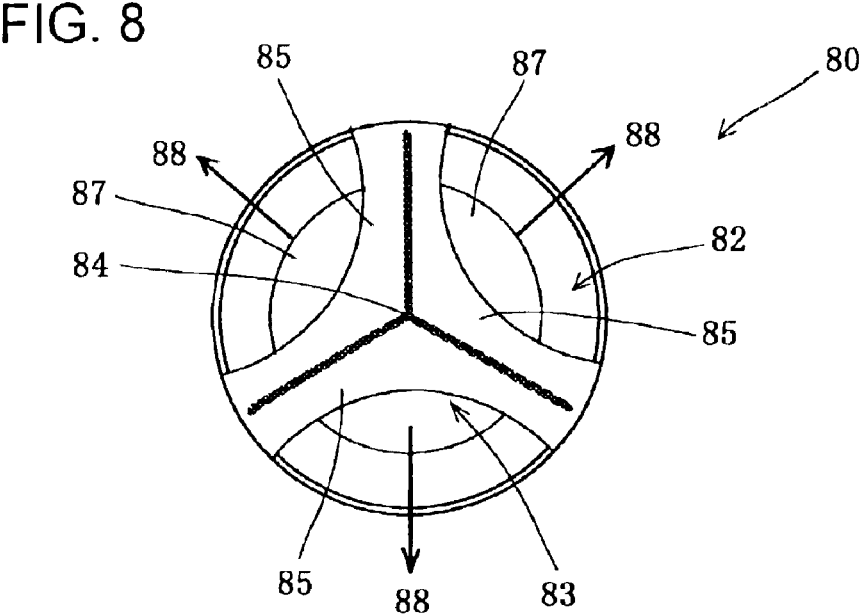
FIG. 9-A
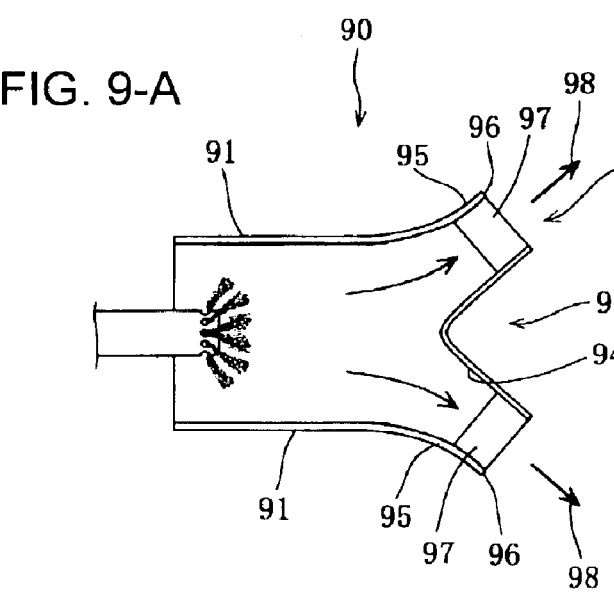
FIG. 9-B
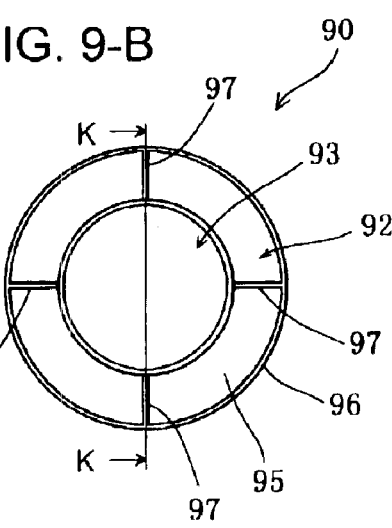

FIG. 11-A
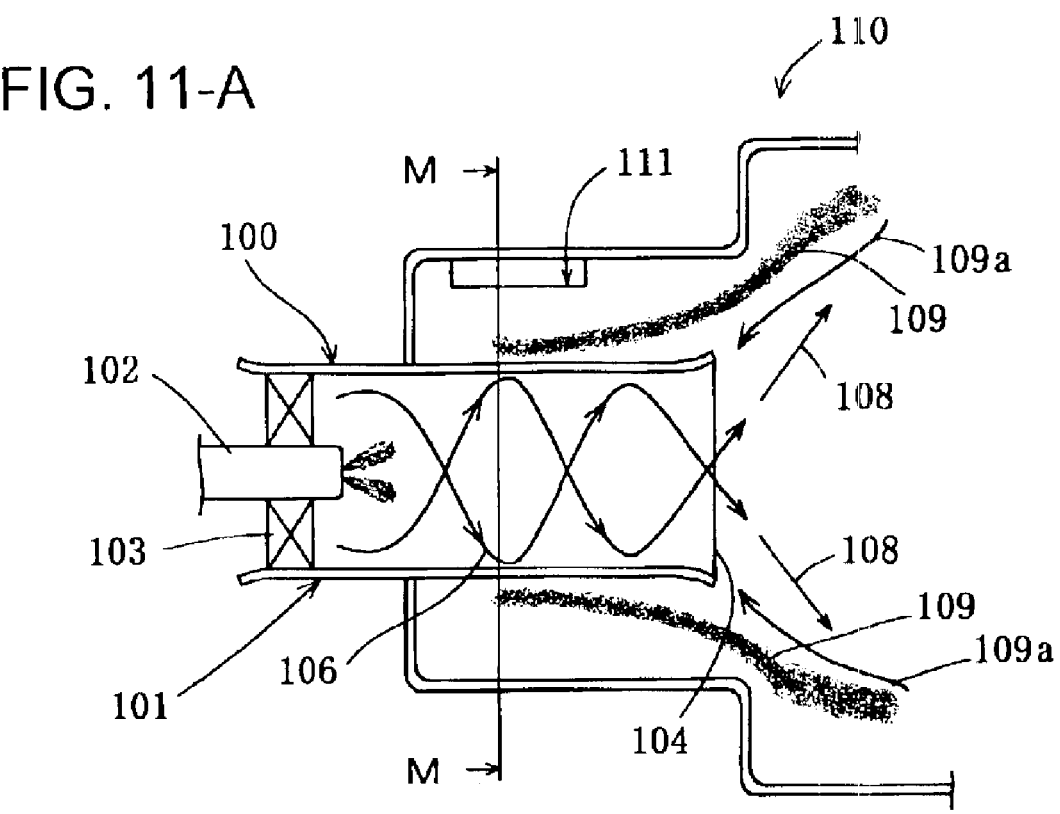
FIG. 11-B
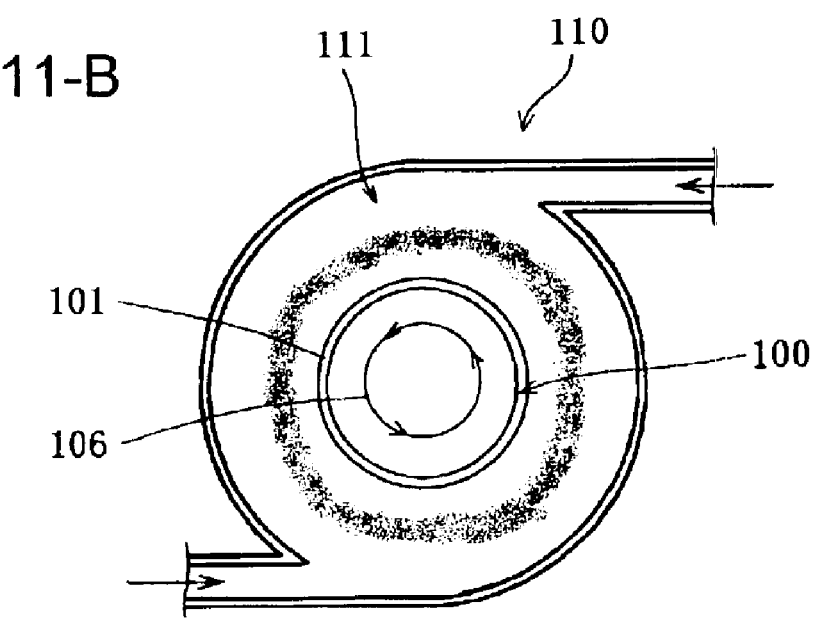

FIG. 12-A
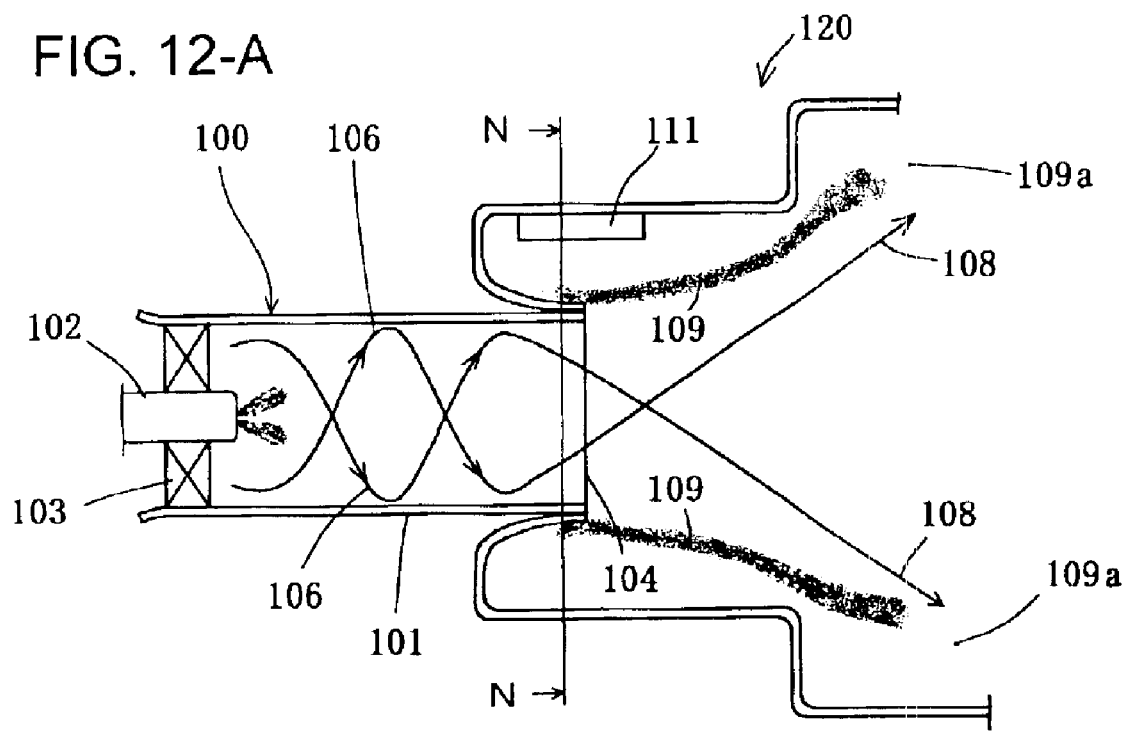
FIG. 12-B
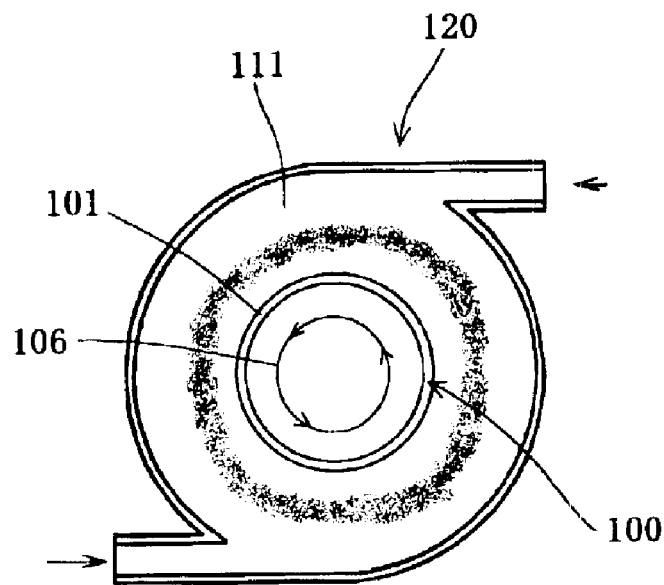

GAS TURBINE COMBUSTOR

BACKGROUND OF THE INVENTION

1. Field of the Invention

The present invention relates in general to combustors which are installed in gas turbine engines (hereafter referred to as "gas turbine combustors") and, more particularly, combustors comprising burners that open into the combustion chamber and mixture injection tubes that inject mixtures of fuel and oxidizer such as air or the like into this combustion chamber.

2. Description of the Related Art

In aero and industrial-gas turbine engines, diffusion flame combustion has conventionally been used. Recently pre-mixed combustion has been used in some industrial gas turbines burning gaseous fuels such as natural gas and is being developed for aero gas turbines. In pre-mixed combustion in gas turbine combustors, mixture of air and fuel is prepared beforehand by supplying fuel into an air stream flowing through a passage connected to the gas turbine combustion chamber. In case the fuel is a liquid, this type of combustion is particularly referred to as pre-mixed and pre-vaporized combustion. In this case, the fuel is not necessarily completely evaporated, but remains in the form of particles. Furthermore, in cases where the amount of air that is mixed with the fuel is considerably larger, than the amount required for complete combustion of the fuel (ordinarily approximately 1.5 times the amount required for complete combustion or more, depending on the conditions such as air temperature), the combustion is referred to as lean pre-mixed (and pre-vaporized) combustion.

The NOx formation rate in combustion shows extremely strong temperature dependence, with NOx being generated in larger amounts at higher temperatures. Since lean pre-mixed combustion is a combustion configuration in which air is present in an excess amount relative to the fuel, the mean combustion temperature is controlled. Furthermore, since the fuel and air are generally well mixed in lean pre-mixed combustion, the formation of local high-temperature regions is excluded, and the combustion temperature is more uniform than in non-premixed combustion. As a result, lean pre-mixed combustion is extremely effective in suppressing NOx formation. Because of the restrictions arising from the heat resistance temperature of turbine materials, the amount of air consumed in combustion in gas turbines is 50% of the total amount of air or less; accordingly, it may be said that lean premixed combustion is a low-NOx combustion technique that is most suited to gas turbines applications in that a large amount of excess air is available.

As the combustion temperature is suppressed by making mixture leaner, the generation of NOx can be suppressed to a greater extent; on the other hand, however, the rate of oxidation of unburned species such as carbon monoxide and fragmented hydrocarbons is also retarded. As a result, the emissions of unburned species tend to increase, and when a certain limit is exceeded, this results in a state in which combustion cannot be sustained at all. This increase in the emissions of unburned species constitutes a drop in combustion efficiency (an increase in fuel consumption), and is not only unwelcome, but is currently impermissible from the standpoint of preventing air pollution.

The mixture ratio of fuel and air is closely related to the combustion gas temperature that governs the formation of NOx. In order to achieve complete combustion and low NOx emissions simultaneously, this mixture ratio must be maintained in a fairly narrow range that includes an optimal value. Attention must be paid to the fact that the optimal value of the mixture ratio is affected not only by the engine operating conditions such as combustion inlet air temperature, the residence time in the combustion region and the like, but also by the temperature and humidity of the atmosphere. In gas turbines, the control of the engine output power and thrust is accomplished by varying the fuel flow rate; accordingly, it is necessary to control the air flow rate in proportion to the fuel flow rate irrespective of power by using a flow rate regulating device, such as a valve or the like in the air passage.

A combustor in which the split of air used for combustion and dilution is controlled by means of butterfly valves is shown in FIG. 14 as an example of a combustor using a flow regulating device. In this gas turbine combustor, it is assumed that the engine is operated at a constant speed. In the gas turbine combustor 130 with controlled air split, extinction of the premixed flame is prevented by means of a diffusion e flame or partially pre-mixed flame of pilot burner 133. Fuel from a fuel nozzle 131 is mixed with air that is forced to swirl by the swirler 134 installed in the entry port of the air passage for the pilot burner 133. The air flows into the combustor from the swirler 134 of the pilot burner 133 that is actuated at the time of engine starting and thereafter, the mixture passages 135 of the main burners 132 that are actuated during operation under a load, dilution air passages 136 with butterfly valves, fixed dilution air holes 137, and cooling holes 139 on the combustion liner 138. Fuel injection holes 140 are disposed in the mixture passages 135. Fuel is injected from the fuel injection holes 140 into and mixed with air, which has been set into a swirling motion by guide vanes or the like, and the mixture is injected into the combustion chamber from the main burners 132. Butterfly valves 141 which modulates the air flow rate are disposed in the premixing air passages 135 and dilution air passages 136. For example, the degree of opening of the butterfly valves 141 can be varied by means of a link mechanism 143 which is connected to an actuator 142 consisting of a servo motor. The link mechanism 143 works so that when butterfly valves 141 for dilution air are substantially fully open, butterfly valves 141 for premixing air are substantially fully closed.

The specific volume of air is much larger than that of fuel. Accordingly, the control of air flow rate requires a mechanical device larger than the control of fuel flow rate. Thus, the manufacturing cost of the air flow control devices is much higher. Another problem of premixing air control is that the flow velocity of the mixture vary in a fairly large range in response to the turn-down of the fuel flow rate (ratio of the maximum flow rate to the minimum flow rate). The upper bound is limited by blow-off and the lower bound is limited by flash-back of flame into the pre-mixing tubes; accordingly, the range in which optimal control can be achieved is generally not wide to cover most of the turn-down required engine operation. Consequently, in cases where the required turn-down is broad, the NOx emissions levels remain high or combustion is incomplete over some range of engine power.

Even if the target for NOx emissions is not set at an extremely low level, the turn-down ratio of lean pre-mixed combustion is considerably narrower than the range required by engine operation.

Another approach for fuel-air ratio control for low NOx emissions over a reasonably wide range of engine operation is the use of a plurality of burners. The number of burners that are being operated is successively increased or decreased in accordance with the output power, i. e., in accordance with the total fuel flow rate. The same principle applies in cases where a large number of burners are divided into several groups, and the number of groups that are being operated is increased or decreased. These method has conventionally been used in many combustor using a diffusion flame or partially pre-mixed flame. In this method, control of the fuel-air ratio can easily be accomplished merely by controlling the fuel flow rate (including switching); accordingly, this method saw immediate practical application in industrial gas turbines using a lean pre-mixed combustion following the introduction of NOx emissions regulations, and has recently used even in aero engine gas turbine combustors.

The structure of a multi-burner type gas-fueled gas turbine engine combustor equipped with eight lean pre-mixed combustion burners surrounding a single diffusion e flame pilot burner is shown in FIG. 15 as one example of a combustor of this type. In the multi-burner type combustor 150 shown in FIG. 15, a plurality of main burners 132 (eight main burners 132), each of which is equipped with a swirler 134 shown in FIG. 14, are disposed at intervals around a pilot burner 133 which is used to maintain premixed flames. A spark plug 152 and dilution air holes 136 which is provided on the downstream side of the spark plug 152 are open in the combustor liner 151 of the combustor 150. In the combustor 150, noting the fact that control of the fuel in the respective main burners 132 is simple, a method in which the number of burners that are lit is successively increased in accordance with engine output power, or a method in which a large number of burners are divided into several groups, and the number of groups that are lit is increased, has been proposed.

This system, unlike mixture ratio control by means of a variable device, the switching of fuel to the burners or burner groups is necessary; accordingly, it is not always possible to maintain all of the burners at the optimal fuel-air ratio, and the following problems regarding fuel arise. In the case of burners or burner groups in which the supply of fresh fuel has been initiated in order to increase the engine output power, the mixture becomes too lean so that even ignition becomes impossible. Or, even if ignition is possible, some burners inevitably pass through a state of incomplete combustion. Furthermore, in cases where only some of the burners are in an operating stage, the flame of these burners or gas in the process of combustion is cooled by the low-temperature air from adjacent burners that are in a non-operating state, so that the emissions of unburned species tends to increase. If an attempt is made to avoid the deleterious effects caused by this interference by increasing the distance between burners, this tends to hinder flame transition between burners (the ignition of burners to which the supply of fuel has been initiated by the flame of adjacent burners that are in operation).

FIG. 16 shows one example of the variation in the NOx emissions concentration and combustion efficiency with respect to the load obtained in an engine test of a multi-burner type combustor 150 shown in FIG. 15. FIG. 16 is a graph which shows the output power on the horizontal axis and the NOx emissions concentration (ppm) and combustion efficiency ($\eta$) on the vertical axis in a case where a fixed speed gas turbine equipped with a single flame-maintaining pilot burner and eight identical lean pre-mixed burners was taken as an example. As is shown in FIG. 16, the pilot burner and two of the main burners are operated up to a load of approximately 50%; afterward, the combustor is operated by increasing the number of main burners that are operated two at a time as the load increases, so that all of the main burners are lit at a load of approximately 90% to 100%. In the figures, P+2M indicates operation with the pilot burner and two main burners. Similarly, P+6M indicates operation with the pilot burner and six main burners. The sawtooth variation in the combustion efficiency is attributable to the following: specifically, when operated main burners are added so that the total fuel supply to the main burners is increased in accordance with an increase in the load, the mixture is initially too lean so that fuel is discharged unburned; then, partial combustion eventually begins, so that full combustion finally occurs. The NOx emissions concentration (here, indicated as a value calculated with oxygen concentration of 15%) also varies in sawtooth form with respect to the load; this variation is attributable to the following: namely, in addition to the fact that the emissions of NOx from the main burners is smaller than that from the pilot burner, the generation of NOx is even smaller in a state in which the mixture from the added main burners is partially burned; accordingly, this emission abruptly drops when main burners are added, and then abruptly increases as a result of the temperature rise caused by improvement of the combustion efficiency. In the case of a multi-burner type combustor such as that of the present example, a drop in the combustion efficiency is an unavoidable problem even when the load is high (e. g., 50% or greater). If priority is given to the combustion efficiency, the NOx level abruptly increases. If the number of burners is increased, the drop in the combustion efficiency at the time of addition is correspondingly reduced; however, the fuel flow rate per burner is reduced, so that fine control of the flow rate becomes indispensable.

As was described above, in cases where an attempt is made to realize lean pre-mixed combustion in an engine, control of the flow rate of the air used for combustion by means of a variable device such as valves or the like and fuel staging between multi-burners are indispensable for realizing the low NOx emissions characteristics of lean pre-mixed combustion while maintaining a sufficiently high combustion efficiency across a broader operating range. In regard to this variable device, there are problems in terms of cost and reliability of operation. Furthermore, in regard to fuel staging, the following problems arise: namely, the discharge of unburned components from burners operating at a non-optimal fuel-air ratio increases in the case of partial output power, or else extremely complicated fuel control becomes indispensable.

Accordingly, considering the existence of such problems, the following problems must be solved in a gas turbine combustor: namely, even in the case of a lean mixture which is difficult to ignite, it is necessary to start the combustion reaction of the mixture utilizing high-temperature burned gas so that the amount of NOx generated is reduced by achieving complete combustion and reducing the temperature rise; furthermore, it is necessary to make it possible to control air/fuel ratio during output by performing simplified control of the fuel supply rate without performing complicated control of the flow rate of air for combustion by means of a variable device such as varying the degree of opening of butterfly valves.

SUMMARY OF THE INVENTION

An object of the present invention is to solve the above-mentioned problems, and to provide a gas turbine combustor which makes it possible to achieve both high combustion efficiency and low NOx emissions concentration over a broad engine output power range without employing a device that varies the flow rate of air for combustion or employing fuel staging in a multi-burner system, by starting reactions of the mixture of fuel and air utilizing high-temperature burned gas even in the case of a lean mixture that is difficult to ignite.

In order to achieve the abovementioned object, the present invention adopts the following means. Specifically, the gas turbine combustor of the present invention comprises burners whose discharge ports open into a combustion chamber, and pre-mixture injection tubes which inject a mixture of fuel and air into the combustion chamber, wherein the mixture that is supplied from the pre-mixture injection tubes is injected into the burned gas of a mixture discharged from the burners, and mixed with this burned gas to react.

In this gas turbine combustor, a mixture is discharged from the discharge ports of the burners into the combustion chamber and burns. The mixture injected into the combustion chamber from the pre-mixture injection tubes is injected into this burned gas and mixed with the burned gas. The mixture that is injected from the pre-mixture injection tubes may be a mixture that is leaner than the lower limit of inflammability, i. e., a mixture that is too lean to ignite at ordinary temperatures regardless of the magnitude of the energy for ignition. Even in such cases, the burned gas is at a high temperature and the radicals in the burned gas are effective in initiating reactions; accordingly, the combustion reaction of the mixture can be started. Furthermore, such mixing with burned gas that contains radicals at a high temperature is also effective in suppressing low-frequency combustion oscillation caused by the flame instability that tends to occur on the lean side in convention pre-mixed combustion. If a sufficient residence time can be obtained in a state in which the mixture and burned gas are mixed, complete combustion is also possible. Meanwhile, even if the fuel concentration is somewhat high, the mixture is dispersed and mixed in the burned gas in which the oxygen concentration is lower than that of air, so that the oxygen concentration following mixing is lower than in cases where mixing is not performed; accordingly, the generation of NOx can be suppressed. In the case of pre-mixed combustion in which the mixture is directly ignited and burned, depending on the shape of the combustion chamber, there may be extremely strong pressure oscillations caused by the abrupt local generation of heat when the fuel concentration is high. However, it has been confirmed that since the mixture is further mixed with burned gas, and the fuel in the mixture is burned, the abrupt generation of heat is suppressed even in cases where the fuel concentration in the mixture is high (unlike the case of an ordinary premixed flame), so that pressure oscillations are suppressed. Especially in cases where this combustor is used for gas turbines in which the air flow rate is constant, the engine is powered by the burners alone from starting up to idle and then the engine output power can be controlled by increasing or decreasing only the fuel flow rate to the pre-mixture injection tubes. Furthermore, the fuel that constitutes the pre-mixture is a gaseous fuel or liquid fuel, and in the case of a liquid fuel, the fuel particles are dispersed in the mixture fluid. Accordingly, some or all of the liquid particles may evaporate to form fuel vapor, or may remain as incompletely pre-vaporized fuel particles. Moreover, the gas that is mixed with the fuel may naturally be ordinary air, or may be a combustion product gas that contains reduced oxygen and a large amount of carbon dioxide, or a gas generated from a coal gasification furnace.

In this gas turbine combustor, flow-deflecting bodies which turn the mixture to the side may be installed in the outlet ports of the pre-mixture injection tubes so that these pre-mixture injection tubes inject the mixture into the burned gas to react. As a result of such flow-deflecting bodies being installed in the outlet ports of the pre-mixture injection tubes, the flow of the mixture that is injected from the outlet ports of the pre-mixture injection tubes is turned to the side by the flow-deflecting bodies and injected into the burned gas, so that the mixture can be mixed with the burned gas from the burners in a short distance.

In the gas turbine combustor equipped with the abovementioned flow-deflecting bodies, the flow-deflecting bodies are bridge bodies which are installed so that these bridge bodies cut across the pre-mixture injection tubes. These bridge bodies may have a wall surface with a U-form or V-form cross sectional shape in which the sharp edge faces upstream in order to split the mixture flow and simultaneously turn the mixture to one side. As a result of forming the flow-deflecting bodies as bridge bodies that are installed across the outlet ports of the pre-mixture injection tubes, the outlet ports of the pre-mixture injection tubes are split by the bridge bodies, and the flow of the mixture that is split by the bridge bodies is injected in a state in which this flow is turned to one side from the axial direction of the pre-mixture injection tubes. Since the bridge bodies have a wall surface with U-form or V-form cross sectional shape which is disposed so that the sharp edge faces upstream, the flow of the split mixture is turned to the side along this wall surface. Accordingly, compared to case in which the pre-mixture injection tubes are constructed from simple tubes, the injection and mixing of the mixture with the burned gas of a mixture that is discharged from the discharge ports of the burners can be accomplished in a short distance. Furthermore, the bridge bodies are connected to the tube walls of the pre-mixture injection tubes. Since the mixture or air flows at a high velocity along the upstream side surfaces of the bridge bodies, the advantage of cooling is obtained. Furthermore, while the flow velocity of the mixture in the burners is limited in order to ensure stabilization of the flame, the flow velocity of the mixture in the pre-mixture injection tubes may be as large as desired; accordingly, the flash-back of flame into the tubes tends not to occur.

In the gas turbine combustor equipped with the bridge bodies, the wall surfaces of the bridge bodies may be formed as planes or smoothly curved surfaces with a straight line extending in the direction that cuts across said pre-mixture injection tube as a generatrix. Since the wall surfaces of the bridge bodies are formed as planes or curved surfaces with a straight line as a generatrix, the wall surfaces of the bridge bodies can be formed as worked surfaces of a plate material by pressing, so that manufacture of the bridge bodies is easy, and so that manufacturing costs can be reduced.

In the gas turbine combustor equipped with the abovementioned bridge bodies, each of the pre-mixture injection tubes may comprise a straight tube part and a bent opening part which is bent from the straight tube part and extends to the outlet port, each bridge body may be installed so that this bridge body cuts across the bent opening part from the inside of the bend to the outside of the bend of this bent opening part, and each bridge body may be formed so that this bridge body becomes wider toward the outside of the bend. For example, the bent formation of the outlet port of each pre-mixture injection tube can be accomplished by rotating and extending the tube end wall of the straight tube part about a tangent line which is tangential to the tube end wall in a state in which the cross-sectional shape is substantially maintained. Some of the wall portions of the bent part may have a flat plate form or a curved plate form. Furthermore, the open edges of the bent opening part that constitutes the outlet port need not necessarily be in the same plane; as long as these edges are formed smoothly, these edges may be formed so that the edges advance in the forward direction or recede in the rearward direction. As a result of the outlet ports of the pre-mixture injection tubes being formed with a bent shape, the following advantage is obtained: namely, the mixture can be turned at a relatively large angle and injected.

In the gas turbine combustor equipped with the above-mentioned bridge bodies, the pre-mixture injection tubes may have open edges which recede in the axial direction of the pre-mixture injection tube moving away from the connecting part with the bridge body, on both sides facing the bridge body. Even if the open edges of the outlet ports of the pre-mixture injection tubes are formed in this manner, the injection flow of the pre-mixture can be turned at a wider angle, so that mixing with the burned gas can be promoted in a short distance. In order to obtain open edges that receded in the axial direction of the pre-mixture injection tubes in the outlet ports of the pre-mixture injection tubes, it is necessary merely to cut the outlet ports of the pre-mixture injection tubes in a plane inclined toward the rear in the axial direction of the pre-mixture injection tubes on both sides of the bridge bodies, so that manufacture is easy, and so that manufacturing costs are also low.

In the gas turbine combustor equipped with the above-mentioned bridge bodies, the pre-mixture injection tubes may have bent side wall parts that widen and open to the side (moving toward the open edges of the outlet port on both sides facing the bridge body). As a result of the side wall surfaces in the vicinity of the outlet ports of the pre-mixture injection tubes being formed as bent side wall parts that widen to the outside, the direction of the injection flow of the mixture can be varied much more smoothly, so that mixing with the burned gas can be promoted in a short distance, and so that favorable combustion and low NOx emissions can be realized.

In the gas turbine combustor equipped with the bridge bodies, slits which extend in the bridging direction can be formed in the centers of the bridge bodies (with respect to the direction of width of the bridge bodies). As a result of the bridge bodies being constructed in this manner, the mixture flow can be split into mixture flows that are turned to the left and right sides and a mixture flow that flows through the central slit, and the mixture that is turned to the left and right sides can be mixed with the burned gas. The jetting of the mixture from the slit has the effect of reducing reverse flow behind the bridge body, so that the stabilization of a flame behind the bridge body is made difficult. As a result, if the system is designed so that the outflow velocity is equal to or greater than the limiting flow velocity for stabilization of a flame, the turned pre-mixture can be reacted after being mixed with the burned gas.

In the gas turbine combustor equipped with the above-mentioned bridge bodies, the bridge bodies can be constructed from at least three bridge branching parts that extend radially from the center of the cross section of the outlet ports of the pre-mixture injection tubes. In cases where at least three burners are disposed around the circumferences of each pre-mixture injection tube, the mixture can be split from a single pre-mixture injection tube and mixed with the burned gas of a mixture discharged from the respective burners by installing a bridge body that has at least three bridge branching parts extending radially from the center in the outlet port of the corresponding pre-mixture injection tube.

In this gas turbine combustor, the flow-deflecting body may be formed as a dish-form body which is attached to the outlet port of each pre-mixture injection tube via ribs, and whose pointed side has a conical surface that faces upstream. As a result of the flow-deflecting bodies being formed as dish-form bodies, the mixture is turned to the outside around the entire circumference of each pre-mixture injection tube by this dish-form body which is attached to outlet port of the pre-mixture injection tubes so that the mixture is injected into the burned gas of a mixture discharged from the burners and mixed with this burned gas. By making the cross-sectional area of the ribs small, it is possible to reduce the effect on the injection of the mixture.

In the abovementioned gas turbine combustor which has dish-form bodies as flow-deflecting bodies, the pre-mixture injection tubes may have skirt parts which surround the dish-form bodies and gradually widen toward the open edges of the outlet port. As a result of skirt parts thus being installed in the outlet ports of the pre-mixture injection tubes, the mixture that flows through the pre-mixture injection tube is guided not only by the dish-form parts on the inside, but also by the skirt parts on the outside, in the outlet ports of the pre-mixture injection tubes, so that the mixture is turned smoothly to the side and mixed with the burned gas.

In this gas turbine combustor, the abovementioned combustion chamber may be constructed so that the chamber has a dome wall part to which the burners are attached, and a tubular wall part that extends downstream from the dome wall part, furthermore, the pre-mixture injection tubes may be attached in the dome wall part in a state in which the pre-mixture injection tubes are substantially parallel to the burners, and the outlet ports open at points further downstream than the discharge ports of the burners. By causing the outlet ports of the pre-mixture injection tubes to open inside the combustion chamber at positions that are further downstream than discharge ports of the burners, it is possible to achieve secure injection of the mixture into the burned gas of a mixture that is discharged from the burners. Furthermore, since the pre-mixture injection tubes are heated by the burned gas, evaporation of the fuel spray is promoted in the case of a liquid fuel, so that a more homogeneous mixture can be formed. In the case of a tubular combustor, the dimensions in the direction of diameter can be made conspicuously more compact than in a case where attachment to the side wall surfaces is adopted, so that the diameter of the casing can be reduced. Furthermore, the pre-mixture injection tubes are exposed to the high-temperature burned gas; however, since the mixture is always flowing at a high velocity through the interiors of the pre-mixture injection tubes, the tube walls of the pre-mixture injection tubes are not excessively heated, so that there are no problems in terms of durability (which is also true in the case of the combustor liner, which is cooled by air). It is desirable that the pre-mixture injection tubes be disposed so that these tubes pass through openings and protrude into the interior of the combustion chamber in the dome wall part in which the end wall surface is formed as a substantially planar surface on the upstream side of the combustion chamber.

In this gas turbine combustor, the abovementioned combustion chamber may be constructed so that this combustion chamber has a dome wall part to which the burners are attached, and a tubular wall part that extends downstream from the dome wall part; furthermore, the pre-mixture injection tubes may be attached in the dome wall part in a state in which the pre-mixture injection tubes are inclined with respect to said burners, and the outlet ports open at points further downstream than the discharge ports of the burners. By disposing the pre-mixture injection tubes at an inclination with respect to the burners in the tubular part, it is possible to apply this gas turbine combustor to an annular combustor liner which has a small height in a small engine. Furthermore, if a plurality of pre-mixture injection tubes are disposed in the tubular part with the position in the axial direction varied, the mixture can be injected in a plurality of stages, so that low NOx and complete combustion can be realized over a broader range.

In this gas turbine combustor, the abovementioned combustion chamber may be constructed so that this combustion chamber has a dome wall part comprising a base end portion and an expanded portion on the upstream side, and a tubular wall part that extends downstream from the dome wall part; furthermore, the burners may be attached to the expanded portion, and the pre-mixture injection tubes may be attached in the base end portion in a state in which the outlet ports open at points further downstream than the discharge ports of the burners. In cases where the dome wall part of the combustion chamber has a base end portion and an expanded portion in which a portion is expanded on the upstream side from the base end portion, as in a combustion chamber liner with a double annular configuration, the burners are attached to the expanded portion, and the pre-mixture injection tubes are attached to the base end portion. In such a structure, even if the length to which the pre-mixture injection tubes protrude into the interior of the combustion chamber is short, a state is obtained in which the outlet ports of the pre-mixture injection tubes open further downstream than the discharge ports of the burners, so that mixing with the burned gas from the burners can be effectively accomplished. In this case, it is desirable to use pre-mixture injection tubes in which the outlet ports are bent so that the turning of the mixture to the side can be increased as the pre-mixture injection tubes.

In this gas turbine combustor, the abovementioned burners can be disposed at intervals in the circumferential direction, and a single pre-mixture injection tube or a plurality of pre-mixture injection tubes can be disposed between adjacent burners. The burners may be disposed in the circumferential direction in the liner dome wall part of the combustion chamber, and the pre-mixture injection tubes may be disposed so that these pre-mixture injection tubes pass through the liner dome wall part between adjacent burners, and so that the outlet ports of these pre-mixture injection tubes open further downstream than the discharge ports of the burners. In cases where the pre-mixture injection tubes are disposed at the half-way point of a line segment connecting the centers of adjacent burners, pre-mixture injection tubes in which the width of the bridge body is set at a substantially equal width on both sides so that the mixture split on both sides can be injected into the burned gas of a mixture discharged from the burners are suitable for use. In cases where the pre-mixture injection tubes are disposed to the inside or outside (in the direction of diameter) of a line segment connecting the centers of adjacent burners, it is advisable to use pre-mixture injection tubes in which the width of the bridge body is varied so that the angle formed by both jets of the mixture is smaller.

In this gas turbine combustor, the abovementioned mixture can be caused to flow in a swirling mixture flow which swirls about the axes of the pre-mixture injection tubes, and this mixture can be turned to the side by this swirling flow when the mixture is injected from the outlet ports. Specifically, the means used to generate a deflected flow may be swirling means that cause the mixture flowing through the pre-mixture injection tubes to swirl about the axes of the pre-mixture injection tubes. When this swirling mixture flow is injected from the outlet ports of the pre-mixture injection tubes, the flow tends to spread outward by virtue of its own centrifugal force, so that this flow enters the high-temperature burned gas of a mixture discharged from the burners, and is rapidly mixed with this burned gas.

In a gas turbine combustor which has swirling means as flow-deflecting means, the pre-mixture injection tubes may be disposed so that at least portions of these tubes on the side of the outlet ports extend into the burned gas of a mixture discharged from the burners in a state in which these portions are surrounded by this burned gas. In a gas turbine combustor which is constructed in this manner, the outlet ports of the pre-mixture injection tubes and the areas in the vicinity of these outlet ports are exposed to the high-temperature burned gas of a mixture that is discharged form the burners; accordingly, evaporation of the fuel spray in the mixture is promoted so that a more homogeneous mixture can be formed. Since a swirling mixture flow is constantly flowing at a high velocity inside the pre-mixture injection tubes, the tube walls of the pre-mixture injection tubes are not excessively heated, so that the system also has good durability.

In a gas turbine combustor which has swirling means as flow-deflecting means, the pre-mixture injection tubes can be disposed so that the outlet ports open further upstream than the burned gas from the burners. In a gas turbine combustor which is constructed in this manner, the thermal effect of the high-temperature burned gas on the pre-mixture injection tubes can be reduced; furthermore, the swirling mixture flow that is injected from the outlet ports of the pre-mixture injection tubes can be mixed with the burned gas through a sufficient residence time. In this disposition, it is desirable that the pre-mixture spread out in the direction of diameter in positions that are somewhat separated from the outlet ports in the axial direction; accordingly, it is advisable to use swirling means which are such that the amount of movement in the axial direction is greater than the amount of angular motion.

BRIEF DESCRIPTION OF THE DRAWINGS

FIG. 1 is a diagram which illustrates one embodiment of the gas turbine combustor of the present invention;

FIG. 2 is a diagram which illustrates another embodiment of the gas turbine combustor of the present invention;

FIG. 3 is a diagram which illustrates still another embodiment of the gas turbine combustor of the present invention;

FIG. 4 is an enlarged view which illustrates especially an embodiment of the pre-mixture injection tubes of the gas turbine combustor of the present invention;

FIG. 5 is an enlarged view which illustrates one example of the shape of the outlet ports of the pre-mixture injection tubes used in the embodiment shown in FIG. 2;

FIG. 6 is an enlarged view which illustrates another example of the shape of the outlet ports of the pre-mixture injection tubes used in the embodiment shown in FIG. 2;

FIG. 7 is an enlarged view which illustrates still another example of the shape of the outlet ports of the pre-mixture injection tubes used in the embodiment shown in FIG. 2;

FIG. 8 is an end view which illustrates one example of the shape of the outlet ports of the pre-mixture injection tubes used in a gas turbine combustor in which the pre-mixture injection tubes are surrounded by a plurality of burners;

FIG. 9 is a diagram which illustrates another example of the shape of the outlet ports of the pre-mixture injection tubes used in a gas turbine combustor in which the pre-mixture injection tubes are surrounded by a plurality of burners;

FIG. 11 is a diagram which shows still another example of a gas turbine combustor in which the pre-mixture injection tubes shown in FIG. 10 are surrounded by burners;

FIG. 12 is a diagram which shows still another example of a gas turbine combustor in which the pre-mixture injection tubes shown in FIG. 10 are surrounded by burners;

DESCRIPTION OF THE PREFERRED EMBODIMENTS

Figure 10:
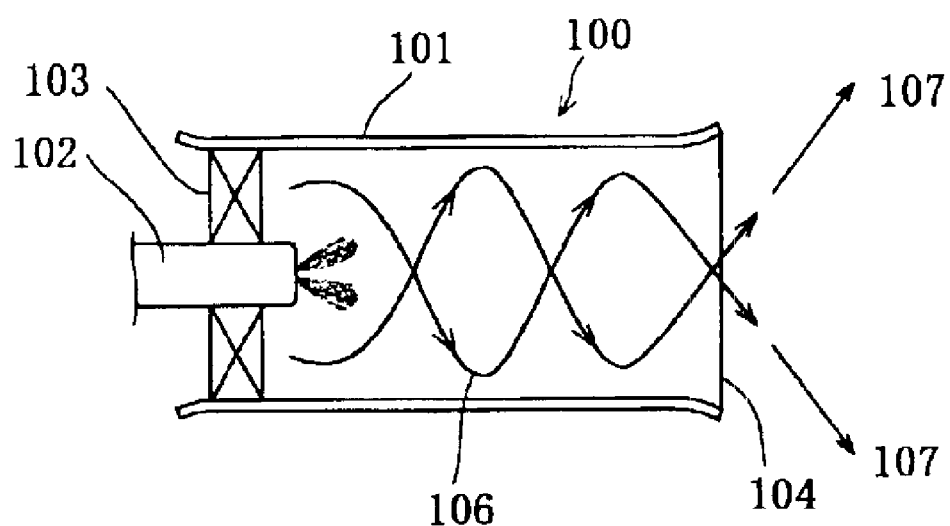
FIG. 10 is a diagram which illustrates one example of pre-mixture injection tubes used in the gas turbine combustor of the present invention, in which the flow-deflecting means that turn the injection flow from the pre-mixture injection tubes to the side are constituted by a swirler.

Embodiments of the gas turbine combustor of the present invention will be described below with reference to the attached figures. FIG. 1 is a diagram which shows an embodiment in which the gas turbine combustor of the present invention is used as a can type combustor employed in a small liquid fueled gas turbine used for power generation. FIG. 1-A is a longitudinal section along the plane A—A in FIG. 1-B, and FIG. 1-B is a cross section along the plane B—B in FIG. 1-A.

In the gas turbine combustor 10 (hereafter abbreviated to "combustor 10") shown in FIG. 1, the combustor liner 12, which forms a can combustion chamber 11, is constructed from a liner dome wall part 13, which constitutes the end wall on the upstream side, and a tubular wall part 14 which extends downstream from the liner dome wall part 13. In the liner dome wall part 13, two burners 15 which have the same configuration are attached in positions that are symmetrical in the direction of diameter with respect to the axial line of the combustor 10 so that these burners 15 pass through the liner dome wall part 13 in a state in which the burners extend parallel to the axial line of the combustor 10. The burners 15 can be consisting of using a pre-mixed pre-evaporated system equipped with a fuel injector and flame stabilizing means. Similarly, in the liner dome wall part 13, two pre-mixture injection tubes 16 which have the same configuration are attached so that these pre-mixture injection tubes pass through the liner dome wall part 13 in a state in which these pre-mixture injection tubes extend parallel to the axial line of the combustor 10. Inside the combustion chamber 11, the outlet ports 17 of the respective pre-mixture injection tubes 16 open in positions that are downstream than the discharge ports 15a of the burners 15, preferably in positions which are such that the combustion of the mixture discharged from the burners 15 has been completed. The outlet ports 17 of the respective pre-mixture injection tubes 16 are equipped with a flow-deflecting body (bridge body 43) having the configuration shown in FIG. 4 described later. The mixture which is injected as a jet from the respective pre-mixture injection tubes 16 has its orientation altered by the flow-deflecting bodies, so that this mixture is injected into the mass of burned gas 19a that is present on the downstream side of the respective flames 19 generated by the adjacent burners 15, 15, and this mixture is mixed with the burned gas 19a.

At idle, fuel is supplied only to the burners 15, and just air is injected from the respective pre-mixture injection tubes 16 consists of air alone. Furthermore, the temperature in the mixing region M where the burned gas 19a from the respective burners 15 and the air from the respective pre-mixture injection tubes 16 is set at (for example) 1200° C. or higher. If this is done, then the pre-mixture that is injected will be a lean mixture with an extremely small fuel-air ratio even when fuel is also supplied to the respective pre-mixture injection tubes 16 during output; accordingly, even if there is a temperature drop, the temperature in the mixing region M will be sufficiently high. Consequently, even in the case of a mixture leaner than the lower limit of inflammability, which cannot be ignited in conventional pre-mixed combustion regardless of the magnitude of the energy for ignition that is used, the radicals in the burned gas are effective in initiating reactions so that combustion of the fuel in the pre-mixture can be started. If a sufficient residence time in a state in which the mixture and burned gas are mixed can be obtained, complete combustion is possible. The engine output power can be controlled by increasing or decreasing flow rate of the fuel that is supplied to the pre-mixture injection tubes 16. So, the control of the fuel-air ratio is extremely simple. In cases where the fuel flow rate is increased following the initiation of output, the combustion efficiency can be caused to reach a value that is close to 100%. Furthermore, it has been confirmed that since the pre-mixture is further mixed with the burned gas and the fuel in the mixture is burned, the abrupt generation of heat can be suppressed even in cases where the fuel concentration in the mixture is high, so that pressure oscillation can be suppressed (unlike the case of an ordinary premixed flame).

In the combustor 10 equipped with two burners 15 and two pre-mixture injection tubes 16 shown in FIG. 1, the positions of the outlet ports 17 of the respective pre-mixture injection tubes 16 are varied in the axial direction of the combustion chamber 11, so that the supply of fuel to the respective pre-mixture injection tubes can be independently performed. In such a case, the pre-mixture is divided and injected in two stages that are separated by a distance in the axial direction; accordingly, the drop in the gas temperature following mixing can be suppressed, and the drop in the combustion efficiency can be kept to a much smaller drop while maintaining the NOx concentration in the exhaust at a low value over an even broader engine output power range. Furthermore, if the air flow rate of the pre-mixture injection tubes 16 is increased, the range of high combustion efficiency and low NOx can be further broadened.

The relationship of the operation of the combustor 10 to the engine operating conditions will be described in detail below. During the period from starting the engine to idle, fuel is equally distributed between the burners 15, and only air is caused to jet from the respective pre-mixture injection tubes 16. In cases where the combustor 10 is used in an engine in which the amount of intake air is constant (so that the total amount of air supplied to the combustor 10 is also constant), the output power at part load can be controlled by maintaining the fuel flow rate of the burners 15 at the same flow rate as that at idle, and just increasing or decreasing the flow rate of the fuel that is supplied to the pre-mixture injection tubes 16; accordingly, control of the engine output power is extremely simple. In cases where the combustor 10 is used in an engine in which the amount of intake air increases with output power, the temperature and pressure of the air supplied to the combustor 10 also vary; accordingly, it is necessary to increase the flow rate of the fuel supplied to the burners 15 along with the increasing input power. However, since the air temperature also rises, stable combustion is possible even if the fuel flow rate is not increased so much as the increase in air flow rate.

Figure 13:
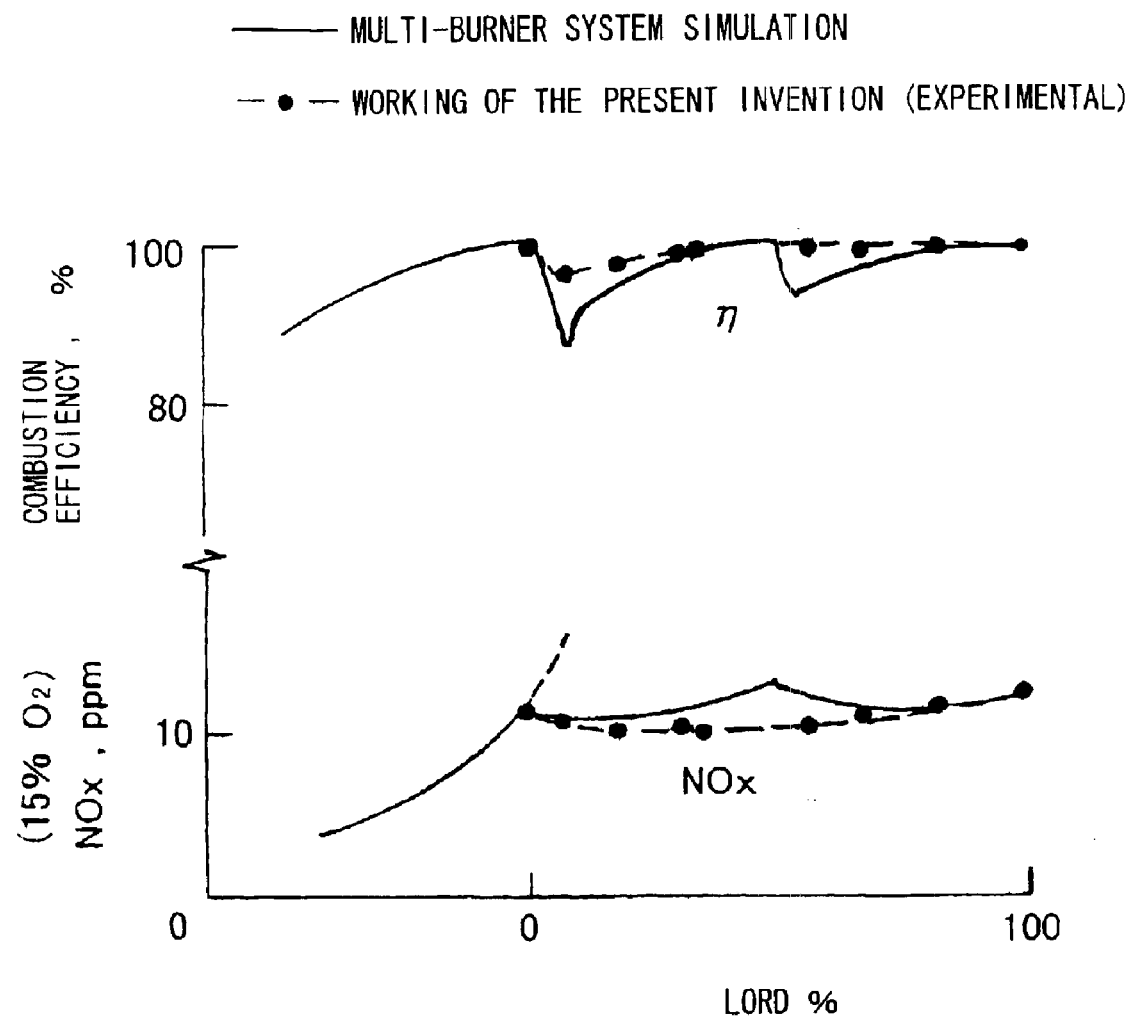
FIG. 13 is a graph which shows the relationship of NOx concentration in the exhaust gas and combustion efficiency to output power in the gas turbine combustor of the present invention, along with the characteristics of a conventional multi-burner type combustor.
Figure 14:
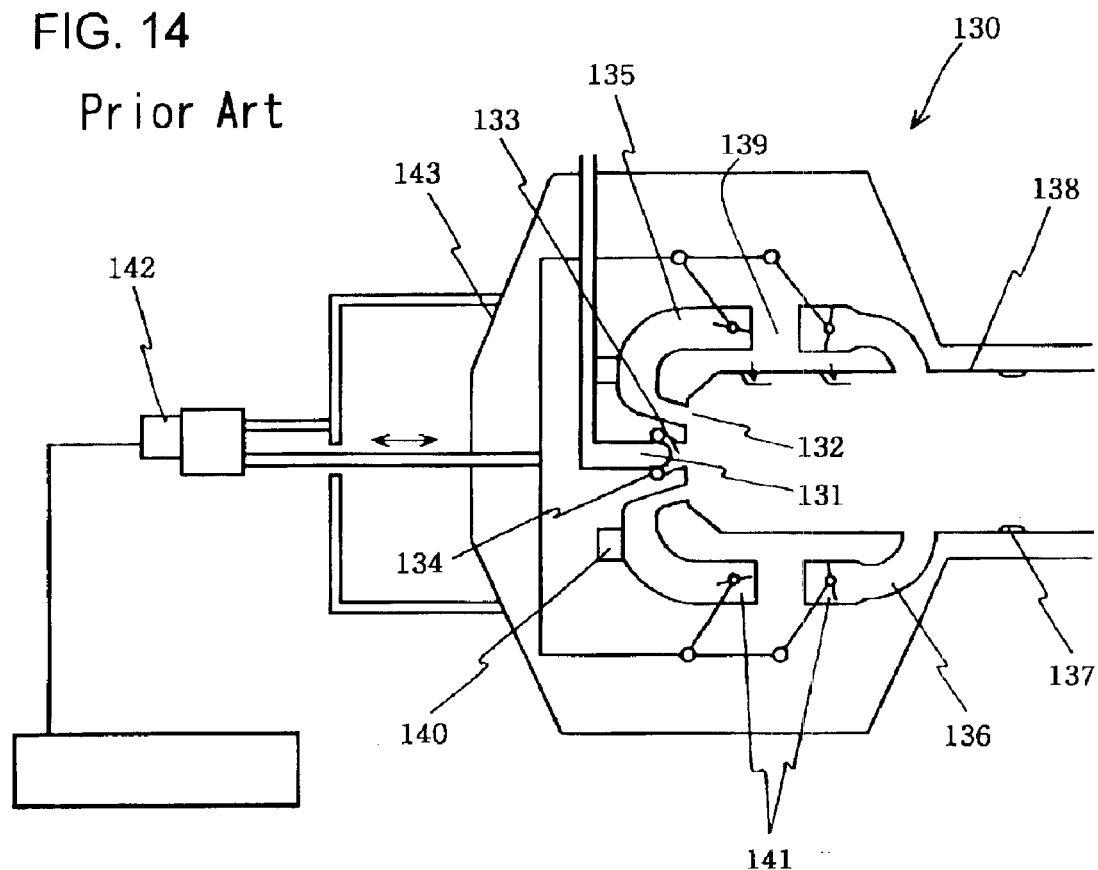
FIG. 14 is a schematic diagram which shows one example of a conventional gas turbine combustor with controlled air split which uses a flow rate regulating device that regulates the flow rates of the air used for combustion and dilution.
Figure 15:
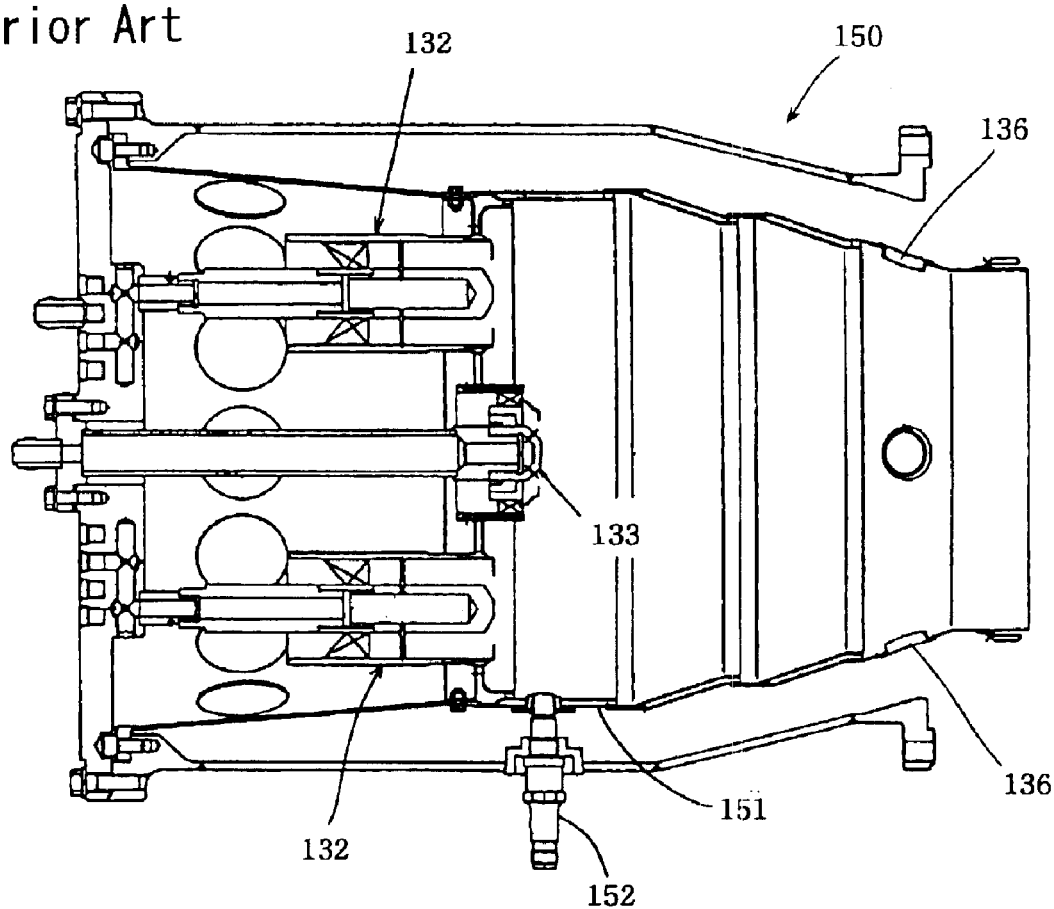
FIG. 15 is a longitudinal sectional view which illustrates one example of a conventional multi-burner type gas-fueled gas turbine combustor.
Figure 16:
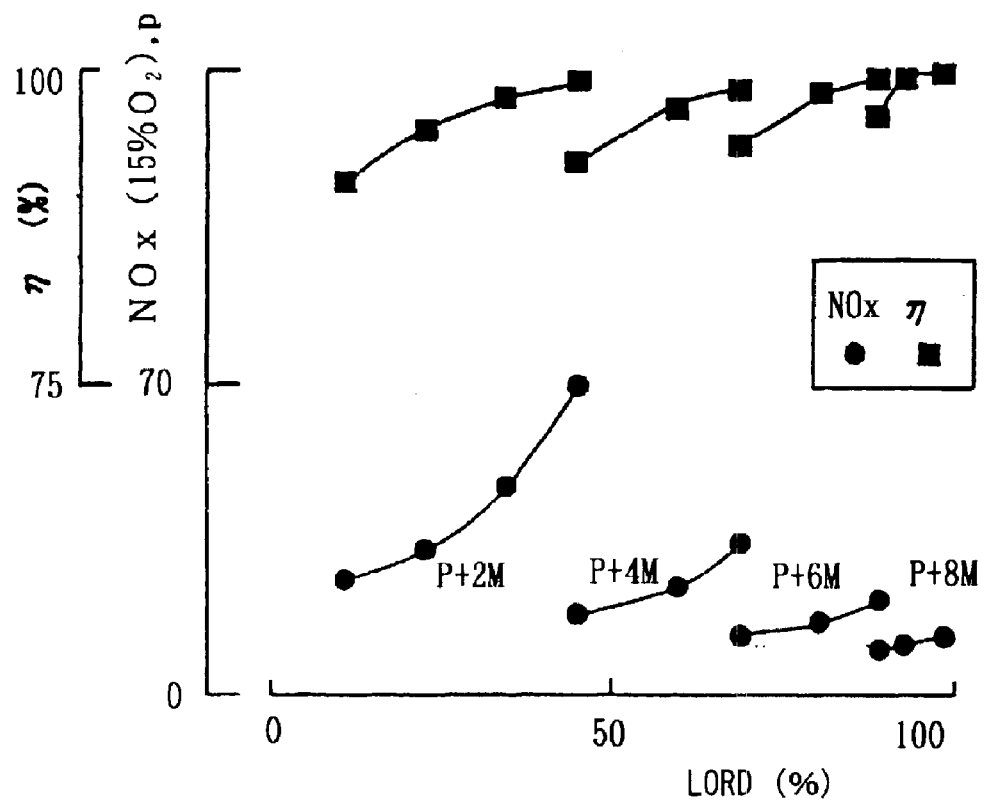
FIG. 16 is a graph which shows one example of the variation of the NOx emissions and the combustion efficiency with load according to on-engine testing of a conventional multi-burner type combustor.

FIG. 13 is a graph which shows the relationship of the NOx concentration in the exhaust gas and the combustion efficiency to the load obtained when the combustor shown in FIG. 1 was tested simulating the operation of a gas turbine with a constant speed. It is seen from FIG. 13 that an extremely low NOx emissions in the exhaust gas and a combustion efficiency $\eta$ of substantially 100% are obtained throughout substantially the entire load range of the engine except for conditions close to idle. In this combustor, the distribution of air to the respective burners 15 and respective pre-mixture injection tubes 16 is designed so that the gas temperature in the mixing region M of the jet 18 of the pre-mixture and the burned gas 19a present on the downstream side of the flame 19 is 1200° C. Taking into account the temperature drop of the mixture caused by the evaporation of liquid fuel, the temperature of the air jetting from the pre-mixture injection tubes 16 is set at a higher temperature. In regard to the operation of the combustor 10 in the on-engine test, the combustor was operated using two pre-mixed combustion burners 15 from starting to idle, after which the amount of fuel supplied to the pre-mixture injection tubes 16 up to the rated load was increased. The test results showed that the NOx concentration was as low as 10 ppm over the entire load range, and that the combustion efficiency $\eta$ was also substantially 100% at a load of 30% or greater, so that it may be said that substantially complete combustion was achieved. The NOx concentration drops after the initiation of fuel injection to the pre-mixture injection tubes 16; subsequently, the rated output power is reached without any appreciable increase even as the fuel flow rate is increased. In regard to the combustion efficiency $\eta$ as well, a slight drop is seen immediately following the initiation of the fuel supply to the pre-mixture injection tubes 16; however, since this combustor 10 is not operated for a long period of time under such conditions, there is no practical problem.

For comparison, the results of a simulation of the NOx emissions and combustion efficiency $\eta$ relative to engine output power for combustors (hereafter referred to as a "multi-burner system") equipped with four burners having the same specifications as the burners 15 (pre-mixed combustion burners) used in the present embodiment are also shown. The operating pattern is a pattern in which two burners are operated from starting up to idle, one other burner is additionally operated from idle to ½ load, and the fourth burner is additionally operated from ½ load up to the rated load. It should be noted that three fuel control lines are requires while two control fuel lines are needed in the combustor 10 of the present invention. After all of the burners reached the rated state (operation at ¼ the rated fuel flow rate of the engine), the combustor was operated with this state maintained. For practical purposes, this is fuel distribution control which minimizes the amount of NOx emissions during high-load operation including the important rated operation. It is clear that if there is a difference between combustion loading of the third and fourth burners, the decrease in the NOx emissions from the burner with reduced combustion loading is less than the increase in NOx emissions from the burner with increased combustion loading. Furthermore, the following problem also occurs: the drop in the combustion efficiency $\eta$ is increased, or else the drop is small, but shifts to a higher load than ½ load.

In the abovementioned simulation, the NOx concentration and combustion efficiency under various load conditions were predicted on the basis of the variations in NOx formation and the combustion efficiency with fuel-air ratio of the pre-mixed burners. In this multi-burner system, it was assumed that all of the burners are operated in lean pre-mixed combustion; accordingly, the NOx concentration at idle is the same as that in the combustor 10 of the present invention, and the concentration under a partial load is also substantially the same. On the other hand, there is a significant difference in combustion efficiency. When the third burner is added, the combustion efficiency drops for some time due to incomplete combustion, and eventually begins to recover as a result of partial combustion, reaching 100% at the design point of this burner. When the fourth burner is added as well, a similar drop in combustion efficiency occurs, although this is relatively small. In order to reduce the magnitude of this drop, it is necessary to increase the number of burners, or to reduce the air flow rate of the third and fourth main burners in order to increase the fuel-air ratio at the same fuel flow rate. In the latter case, however, a steep increase in NOx emissions is unavoidable as the fuel flow rates of the third and fourth main burners approaches the rated values.

With the combustor 10, the exhaust gas can be cleaned when the engine is operated at a partial load. The output power of a gas turbine is strongly influenced by the temperature of the atmosphere (as the air temperature increases, the output power is reduced and the efficiency also drops). Accordingly, in the case of conventional lean pre-mixed combustion in which the variation of the NOx concentration level relative to fuel-air ratio is large, the fuel-air ratio at which the engine is operated will be a fuel-air ratio at which the NOx concentration increases steeply if an attempt is made to obtain the same output power at a high air temperature. Conventionally, it has been necessary to lower the engine output power in order to meet NOx regulations. In the case of the combustor 10 of the present invention, the oxygen concentration of the mixture is lower than that of air, and this oxygen is spatially dispersed so that the production of NOx can be suppressed. Thus, since the region in which the variation in the NOx emissions level with fuel-air ratio is small is a broad region, the abovementioned problem can be avoided by design.

FIG. 2 is a diagram which shows another embodiment of the gas turbine combustor of the present invention. FIG. 2-A is a partial longitudinal section, and is a view along the plane C—C shown in FIG. 2-C, FIG. 2-B is a partial longitudinal section along the plane D—D shown in FIG. 2-C, and FIG. 2-C is a partial cross section. The gas turbine combustor 20 (hereafter abbreviated to "combustor 20") shown in FIG. 2 is constructed as an annular combustor; constituent the elements which have the same function as constituent elements of the combustor 10, shown in FIG. 1, are labeled with the same symbols. Nowadays, combustors that have such an annular configuration are used in aircraft engines almost without exception. In the combustor 20, a combustor liner 22 which has an annular combustion chamber 21 formed inside is constructed from an annular dome wall pat 23, and an inner wall parts 24 and outer wall part 25 which extend from the annular dome wall parts 23. A plurality of burners 15 and pre-mixture injection tubes 16 are alternately installed at intervals in the annular dome wall part 23 in a state in which these parts extend parallel to the axial direction of the combustor 20. The pre-mixture injection tubes 16 are disposed so that the outlet ports 17 of these pre-mixture injection tubes 16 open in the annular combustion chamber 21 in positions that are further downstream than the discharge ports 15a of the burners 15, in the same manner as in the case of the can type combustor 10 shown in FIG. 1. Preferably, the pre-mixture injection tubes 16 are disposed so that the outlet ports 17 of the respective pre-mixture injection tubes 16 open further downstream than the position where the combustion of the mixture discharged from the burners 15 is completed. The configuration of the outlet ports 17 of the respective pre-mixture injection tubes 16 is preferably the configuration shown in FIG. 4 or FIG. 5 described later. The jets 18 of the mixture that is split into two parts and injected from the respective pre-mixture injection tubes 16 enter a mass of burned gas that is present on the downstream side of the flame 19 from the burners 15, and these jets are mixed with this burned gas.

In the annular combustor shown in FIG. 2, the pre-mixture injection tubes 16 may also be disposed in positions along the inner wall part 24 and outer wall part 25 as in the combustor 20a shown in FIG. 2-D. In this case, the positions of the outlet ports 17 of the pre-mixture injection tubes 16 on the inner circumferential side and outer circumferential side are alternately shifted in the axial direction of the combustor 20, so that the flow rates of the fuel contained in the mixture injected from the respective pre-mixture injection tubes 16 can be independently controlled. For example, the outlet ports 17 of the pre-mixture injection tubes 16 disposed on the inner circumferential side are disposed further downstream than those of the pre-mixture injection tubes 16 disposed on the outer circumferential side. By using such a disposition, it is possible to achieve both a low NOx concentration and complete combustion over a much broader range of engine fuel-air ratios while alleviating the thermal effect from the burned gas.

FIG. 3 shows another embodiment of the gas turbine combustor of the present invention. FIG. 3-A is a partial longitudinal section along the plane E—E in FIG. 3-B, and FIG. 3-B is a partial cross section along the plane F—F in FIG. 3-A. In the gas turbine combustor 30 (hereafter abbreviated to "combustor 30") shown in FIG. 3, the combustor liner 32 is of a double annular configuration in which a portion of the combustion chamber 31 formed in an annular space is expanded on the upstream side. The burners 15 are disposed at intervals in the circumferential direction in the annular base end part 33 of the combustor liner 32. Furthermore, the pre-mixture injection tubes 16 are alternately disposed in the circumferential direction in an expanded part 34 formed on the outer circumferential side of the base end part 33 as a part of the combustor liner 32, and are disposed so that these pre-mixture injection tubes 16 are shifted in the circumferential direction with respect to the burners 15 as well. As a result, the amount by which the pre-mixture injection tubes 16 protrude into the interior of the combustion chamber 31 is reduced, so that the pre-mixture injection tubes 16 can inject the mixture as jets 18 into the completely or near completely burned gas following sufficient combustion of this gas, and can mix this mixture with the burned gas. The pre-mixture injection tubes 16 may also be installed in contact with the inside or outside of the annular combustor liner 32. In this case, as in the case of the combustor 20, if the positions of the outlet ports 17 of the pre-mixture injection tubes 16 are shifted in the direction of flow of the combustion chamber 31 so that the fuel flow rates to the respective pre-mixture injection tubes 16 can be independently controlled, low NOx performance and complete combustion can both be realized over a broader range of engine fuel-air ratios. In the combustor 30, it is desirable to use the configuration shown in FIG. 4 as the configuration of the outlet ports 17 of the pre-mixture injection tubes 16.

FIG. 4 shows enlarged views of examples of the shape of the outlet ports of pre-mixture injection tubes that can be used in gas turbine combustors of the types shown in FIGS. 1 and 3. FIG. 4-A is a side view of one example of this shape, FIG. 4-B is an end view of the same, FIG. 4-C is a side view of another example of this shape, and FIG. 4-D is an end view of the same. As is shown in FIGS. 4-A and 4-B, the pre-mixture injection tubes 40 each comprise a straight tube part 41 and a bent opening part 42 which starts from the straight tube part 41 and which extends to the outlet port 17. As a result of the configuration of the bent opening part 42, the outlet port 17 opens in an inclined state with respect to the axial line 41a of the straight tube part 41. For example, the bent opening part 42 can be formed by rotating the tube end wall of the straight tube part 41 about a tangent line 41b that is tangential to the tube end wall in a state in which the cross-sectional shape is substantially maintained, and extending this tube end wall. The bent wall portion of the bent opening part 42 may be a flat wall part 44a as shown in FIGS. 4-A and 4-B, or may be a curved wall part 44b as shown in FIGS. 4-C and 4-D. The flat wall part 44a can be formed by inclining a portion of the bent opening part 42 to the inside in a cut state in the plane 44c. Furthermore, the open edges 46 of the bent opening part 42 that forms the outlet port 17 need not necessarily be in the same plane; as long as these edges are smoothly formed, the edges may be formed so that they advance in the forward direction or recede in the rearward direction.

In order to inject the pre-mixture after splitting the pre-mixture and turning the pre-mixture to the side, bridge bodes 43 used as flow-deflecting bodies are installed in a state in which these bridge bodies cut across the bent opening parts 42 from the inside of the bend to the outside of the bend of the bent opening parts 42. For example, the cutting and plastic working of the end walls in the tube ends can form these bridge bodies 43. Each bridge body 43 has a wall surface 47 with a V-shape cross section whose sharp edge faces upstream. Both ends form connecting parts 45a and 45b, and are connected to the open edges 46 of the outlet port 17. The width of each bridge body 43 is narrow at the connecting part 45a on the inside of the bend, but is gradually widened moving toward the connecting part 45b on the outside of the bend. The wall surface 47 of each bridge body 43 is formed as a planer surface or smooth curved surface on the basis of a rectilinear generatrix 47a extending in the direction that cuts across the pre-mixture injection tube 40; accordingly, the manufacture of the bridge parts 43 is easy, and the manufacturing costs can be reduced.

In the pre-mixture injection tubes 40, the bridge bodies 43 divide the outlet ports 17 into two outlet port parts 49, and the pre-mixture is injected by two jets 48 that move away from each other to the sides from the respective outlet port parts 49 with respect to the axial line of the pre-mixture injection tube 40, and that also have an inclined component.

In particular, in cases where the respective burners 15 are disposed in positions that are separated at an inclination from the pre-mixture injection tubes 40, the pre-mixture can be injected and mixed with the burned gas from the respective burners 15 in a shorter distance than in the case of simple tubes. By forming the outlet ports 17 of the pre-mixture injection tubes 16 as bent opening parts 42 and increasing the width of the bent opening parts 42 on the outside of the bend, it is possible to turn and inject the mixture at a relatively large angle. This configuration is convenient in cases where jets 48 that are turned to a considerable extent are required, as is seen in cases where the pre-mixture injection tubes 40 are disposed along the tubular part 14 of the combustor 10. Furthermore, if bent tubes in which a bent length is present on both the inside and outside of the bend are used instead of the bent opening parts 42 in expectation of the same effect, the following problem arises: namely, flow separation occurs in the inside bent part, so that the flame tends to flash-back to this area, and at high temperatures and high pressures, there is a danger that the reaction will proceed in this area, so that spontaneous ignition occurs.

FIG. 5 shows enlarged views illustrating one example of the shape of the outlet ports of the pre-mixture injection tubes 50 used in the embodiment shown in FIG. 2. FIG. 5-A is a longitudinal section along the plane G—G in FIG. 5-B, and FIG. 5-B is an end view of FIG. 5-A. As is shown in FIG. 5, in order to cause the pre-mixture to be split and simultaneously turned to the side in the outlet ports 52 of the straight tubes 51 that constitute the pre-mixture injection tubes 50, bridge bodies 53 used as flow-deflecting bodies are installed in a state in which these bridge bodies 53 cut across the outlet ports 52. Each bridge body 53 has a wall surface 54 with a V-shaped cross section in which the sharp edge faces upstream; furthermore, the width of each bridge body 53 is uniform, and both ends form connecting parts 55, 55 that are connected to the tube ends of the straight tube 51. The outlet ports 52 are divided into two outlet port parts 57, 57 by the bridge bodies 53. The wall surface 54 of each bridge body 53 is formed as a planar surface or smooth curved surface on the basis of a rectilinear generatrix which extends in a direction that cuts across the pre-mixture injection tube 50. Accordingly, the manufacture of the bridge bodies 53 is easy, and the manufacturing costs can be reduced.

The open edges 56 that define the outlet ports 52 extend at an inclination receding in the axial direction of each pre-mixture injection tube 50 on both sides facing the bridge body 53, as the open edges 56 move away from the connecting parts 55, 55 with the bridge body 53. Such opening ports 52 can be formed merely by cutting the tube ends of the pre-mixture injection tubes 50 on both sides of the bridge bodies 53 in a plane that is inclined toward the rear in the axial direction. Accordingly, manufacture is easy, and the manufacturing costs are also low. Pre-mixture injection tubes 50 in which the outlet ports 52 are constructed in this manner split the mixture that flows through the straight tube 51, and simultaneously inject the respective split mixtures to the side from the outlet port 52, i. e., as jets 58 that are turned in directions that move away from each other along the wall surface 54 from the direction running along the axial line of the straight tube 51. Accordingly, the mixture can be injected into the burned gas that is discharged from the respective burners 15 and mixed with this burned gas in a shorter distance than in the case of conventional tubes that have simple openings. Even in the case of opening ports 52 that are formed by cutting the tube ends at an inclination, the pre-mixture can be turned to the side at a wide angle and injected as respective pre-mixture jets 58 as a result of the flow-deflecting action of the bridge bodies 53, so that mixing with the burned gas can be promoted in a short distance.

FIG. 6 shows enlarged views that illustrate another example of the shape of the outlet ports of pre-mixture injection tubes 60 that can be used in the embodiment shown in FIG. 2. FIG. 6-A is a side view along the plane H—H in FIG. 6-B, and FIG. 6-B is an end view of FIG. 6-A. In the pre-mixture injection tubes 60 shown in FIG. 6, bent side wall parts 69 which spread out toward the sides as they approach the open edges 66 are formed in the outlet ports 62 formed in the tube ends of the straight tubes 61, on both sides facing the bridge bodies 63 used as flow-deflecting bodies. Each bridge body 63 has a wall surface 64 with a V-shaped cross section whose sharp edge faces upstream. Furthermore, the width of each bridge body 63 is uniform, and both ends form connecting parts 65, 65 that are connected to the ends of the straight tube 61, so that the outlet ports 62 are divided into two outlet port parts 67, 67. The side wall edges 66 formed by the bridge body 63 and the bent side wall parts 69 on the open end side are disposed in a plane that is substantially perpendicular to the jets 68. The bridge body 63 and bent side wall parts 69 act in conjunction to turn the flow of the mixture to the side much more smoothly, so that the mixture is injected as jets 68. Accordingly, mixing with the burned gas is promoted in a short distance, so that favorable combustion and low emissions can be realized.

The cross-sectional shape of the wall surfaces 47, 54 and 64 of the bridge bodies 43, 53 and 63 may be U-shaped instead of V-shaped. The bridge bodies 43, 53 and 63 basically have the function of injecting the jets 48, 58 and 68 of the pre-mixture into a mass of burned gas in order to cause the reaction of a mixture that is leaner than the lean side combustion limit, and do not attempt to maintain the flame by means of this action. Since the object here is to react the pre-mixture after mixing the pre-mixture with the burned gas (without maintaining the flame of the pre-mixture by means of the bridge bodies), it is desirable that the flow velocity inside the pre-mixture injection tubes 40, 50 and 60 be high. As a result of the velocity of the mixture or air being set at a high velocity, an advantage is obtained in that the pre-mixture injection tubes 40, 50 and 60 and the upstream side surfaces of the bridge parts 43, 53 and 63 are cooled by the mixture or air that flows along these parts; furthermore, an advantage is also obtained in that pressure fluctuations during high combustion load are suppressed, and flash-back into the tubes tends not to occur.

FIG. 7 shows enlarged views that illustrate still another example of the shape of the outlet ports of pre-mixture injection tubes that can be used in the embodiment shown in FIG. 2. FIG. 7-A is a side view along the plane J—J in FIG. 7-B, and FIG. 7-B is an end view of FIG. 7-A. In the pre-mixture injection tubes 70 shown in FIG. 7, a slit 74 which extends in the bridging direction is formed in the center (with respect to the direction of width) of the bridging body 73 that is installed as a flow-deflecting body in the outlet port 72 formed in the tip end of the straight tube 71. As a result of such slits 74 being formed in the bridging bodies 73, the mixture is split into jets 78a, 78a that are turned to the side from the outlet ports 77, 77 that are split to the left and right, and a jet that flows out through the central slit 74, and the jets that are turned to the left and right sides can be mixed with the burned gas. The jetting of the mixture from the slit reduces the reverse flow behind the bridge body, and has the effect of making it difficult to maintain a flame in this area. As a result, if the system is designed so that the outflow velocity is equal to or greater than the limiting flow velocity for flame stabilization, the pre-mixture that has been turned can be reacted after being mixed with the burned gas. The other configuration are similar to those of the pre-mixture injection tubes 50 shown in FIG. 5; accordingly, a repeated detailed description is omitted.

FIG. 8 is an end view which shows one example of the shape of the outlet ports of pre-mixture injection tubes that can be used in a gas turbine combustor in which pre-mixture injection tubes are disposed so that these tubes are surrounded by a plurality of burners, or in which such pre-mixture injection tubes are disposed so that these tubes are surrounded by annular burned gas from a single burner. In the pre-mixture injection tubes 80 shown in FIG. 8, bridge bodies 83 used as flow-deflecting bodies can be constructed from at least three bridge branching parts 85 that extend radially from the cross-sectional center 84 of each bridge body 83 in the outlet ports 82 of the pre-mixture injection tubes 80. In cases where at least three burners are disposed around the circumference of each pre-mixture injection tube 80, the installation of these bridge bodies 83 in the outlet ports 82 of the pre-mixture injection tubes 80 makes it possible to form a construction in which the mixture that flows through each pre-mixture injection tube 80 is injected as respective split jets 88 from three outlet port parts 87 formed between adjacent bridge branching parts 85, 85 into the burned gas that is discharged from the corresponding burners, and this mixture is mixed with the burned gas.

FIG. 9 shows diagrams that illustrate another example of the shape of the outlet ports of pre-mixture injection tubes that can be used in a gas turbine combustor in which pre-mixture injection tubes are disposed so that these tubes are surrounded by a plurality of burners, or in which such pre-mixture injection tubes are disposed so that these tubes are surrounded by annular burned gas from a single burner. FIG. 9-A is a side view along the plane K—K in FIG. 9-B, and FIG. 9-B is an end view of FIG. 9-A. In the pre-mixture injection tubes 90 shown in FIG. 9, the flow-deflecting bodies are dish-form bodies 93 which are attached to the outlet ports 92 of the pre-mixture injection tubes 90 via ribs 97, and which have a conical surface whose pointed end faces upstream. In the pre-mixture injection tubes 90, a skirt part 95 which surrounds the dish-form body 93 and which gradually widens as the skirt part 95 approaches the open edges 96 of the outlet port 92 facing the conical surface 94 of the dish-form body 93 can be installed in the tip end portion of the straight tube 91. As a result of the flow-deflecting bodies being formed as dish-form bodies 93, and being equipped with a skirt parts 95 that face these dish-form bodies 93, the mixture that flows through the pre-mixture injection tubes 90 is guided not only by the dish-form bodies 93 on the inside, but also be the skirt parts 95 on the outside, so that the mixture can be smoothly turned to the side over the entire range of the pre-mixture injection tubes 90, and can be issued as jets 98 from the outlet ports 92, so that this mixture is mixed with the burned gas discharged from the burners 15. The blocking effect of the ribs 97 on the injection of the pre-mixture can be reduced by minimizing the cross-sectional area of the ribs 97.

FIG. 10 is a diagram which shows one example of a pre-mixture injection tube. In this example, the flow-deflecting means that turn the mixture flowing through the pre-mixture injection tube to the side when this mixture is caused to jet out as jets consist of a swirler which causes a swirling flow about the axis of the corresponding pre-mixture injection tube. In the pre-mixture injection tube 100 shown in FIG. 10, a fuel injector 102 which injects fuel in the form of a spray from the tip end is disposed on the base end of a straight injection tube main body 101, and a swirler 103 which imparts a swirling motion to the flow of the air is disposed between the injection tube main body 101 and the fuel injector 102. In a gas turbine combustor equipped with this pre-mixture injection tube 100, each pre-mixture injection tube 100 may be disposed so that this tube is surrounded by a plurality of burners. No flow-deflecting body is installed in the tip end of the injection tube main body 101, and the outlet port 104 is not bent, so that the injection tube main body opens "as is". The air stream that flows into the injection tube main body 101 in a state in which a swirling motion is imparted by the swirler forms a swirling flow that contains a fuel spray from the fuel injector 102. This swirling flow 106 forms a jet 108 that widens to the outside from the tip end of the injection tube main body 101, and is injected into the burned gas 108 from the burners.

FIG. 11 shows still another example of a gas turbine combustor in which the pre-mixture injection tube is surrounded by burned gas from a swirling burner. FIG. 11-A is a longitudinal section along the plane N—N in FIG. 11-B, and FIG. 11-B is a cross section. A burner 111 in which the main mixture enters in a tangential direction, and a pre-mixture injection tube 100 of the type shown in FIG. 10, are disposed in the base end part of the gas turbine combustor 110 (hereafter abbreviated to "combustor 110"). The flame 109 from the burner 111 flows in the downstream direction along the outside of the injection tube main body 101 of the pre-mixture injection tube 100. The outlet port 104 of the pre-mixture injection tube 100 opens at the position of the flame 109 where the main mixture from the burner 111 is burned. When the swirling flow 106 from the pre-mixture injection tube 100 is injected from the outlet port 104 as a jet 108, this jet 108 is injected while spreading to the sides as a result of its own centrifugal force (created by the swirling motion); this stream enters the high-temperature burned gas 109*a* present on the downstream side of the flame 109 that is discharged from the burner 111, and is rapidly mixed with this burned gas 109*a*. In the gas turbine combustor 110 constructed in this manner, the jet 108 that is injected from the pre-mixture injection tube 100 is mixed with the burned gas 109*a* on the basis of a sufficient residence time. Furthermore, since the outlet port 104 of the pre-mixture injection tube 100 and the area in the vicinity of this outlet port are exposed to the high-temperature flame 109 that is discharged from the burner 111, the evaporation of the fuel spray in the mixture is promoted, so that a more homogeneous mixture can be formed. Furthermore, since the swirling flow 106 is constantly flowing at a high velocity inside the pre-mixture injection tube 100, the tube walls of the pre-mixture injection tube 100 are not excessively heated, so that this embodiment is also favorable in terms of durability.

FIG. 12 shows still another example of a gas turbine combustor in which the pre-mixture injection tube is surrounded by burned gas from a swirling burner. FIG. 12-A is a longitudinal section along the plane O—O in FIG. 12-B, and FIG. 12-B is a cross section. Compared to the gas turbine combustor 110 shown in FIG. 11, the gas turbine combustor 120 shown in FIG. 12 is disposed in a state in which the pre-mixture injection tube 100 is not exposed to the flame 109 of the burner 111. In a gas turbine combustor constructed in this manner, the pre-mixture injection tube 100 is not exposed to the high-temperature flame 109; accordingly, from the standpoint of heat resistance, this is advantageous in material and mechanical terms.

The gas turbine combustor of the present invention is constructed form a combustor liner and burners and pre-mixture injection tube which are attached to the wall surfaces of this liner. These pre-mixture injection tubes form a mixture of fuel and air, and this mixture is injected from the outlet port openings into burned gas created by burners, so that this mixture is mixed with the burned gas. Since the burned gas is at a high temperature and contains radicals in large amounts, even an extremely lean fuel mixture which cannot be burned as a conventional flame can be caused to react, so that complete combustion can be accomplished by appropriately setting the temperature and residence time. Accordingly, a gas turbine combustor can be provided in which even extremely lean mixtures can be caused to react, and in cases where this gas turbine combustor is used in a jet engine or gas turbine, complete combustion (a high combustion effect) and an extremely low NOx concentration can be simultaneously achieved relatively easily and over a broad output power range that is impossible in the case of a conventional gas turbine combustor. As one means for injecting the mixture into the burned gas discharged from the burners, a structure can be employed in which bridge bodies having a wall surface that has a sharp edge on the upstream side and a broad end on the downstream side are disposed in the outlet ports of the pre-mixture injection tubes, so that the mixture is turned at a large angle with respect to the axial direction of the pre-mixture injection tubes, and is injected to the side. Furthermore, as another structure, a structure can be employed in which the mixture is formed into a jet that is caused to spread out to the sides by the centrifugal force of this stream when the stream leaves the outlet port, this being accomplished by injecting the fuel that is injected into the pre-mixture injection tubes together with an air stream that has been given a swirling flow configuration. The mixture that is injected as jets from the pre-mixture injection tubes can be effectively mixed with the burned gas in a short distance, so that complete combustion (a high combustion effect) and an extremely low NOx concentration can be achieved.

What is claimed is:

1. A gas turbine combustor comprising:
   burners whose discharge ports open into a combustion chamber; and
   pre-mixture injection tubes which inject a mixture of fuel and air into said combustion chamber,
   wherein said mixture that is supplied from said pre-mixture injection tubes is injected into burned gas of a mixture discharged from said burners, and mixed with said burned gas to react,
   wherein said pre-mixture injection tubes include a flow-deflecting body which turns said mixture to one side at outlet ports of said pre-mixture injection tubes in order to inject said mixture into said burned gas to react, and
   wherein said flow-deflecting body is a bridge body that is installed across said pre-mixture injection tubes, and said bridge body has a wall surface with a U-form or V-form cross sectional shape in which the sharp edge faces upstream in order to split said mixture and simultaneously turn the mixture to one side.

2. The gas turbine combustor according to claim 1, wherein said wall surface of said bridge body is formed as a plane or smoothly curved surface with a straight line extending in the direction that cuts across said pre-mixture injection tube as a generatrix.

3. The gas turbine combustor according to claim 1, wherein said pre-mixture injection tubes each comprise a straight tube part and a bent opening part which is bent from said straight tube part and extends to said outlet port, said bridge body is installed so that this bridge body cuts across said bent opening part from the inside of the bend to the outside of the bend of said bent opening part, and said bridge body is formed so that this bridge body becomes wider toward the outside of said bend.

4. The gas turbine combustor according to claim 1, wherein said pre-mixture injection tubes each have open edges which recede in the axial direction of the pre-mixture injection tube as they move away from the connecting part with said bridge body, on both sides facing said bridge body.

5. The gas turbine combustor according to claim 1, wherein said pre-mixture injection tubes each have bent side wall parts that widen and open to the side as they approach the open edges of said outlet port on both sides facing said bridge body.

6. The gas turbine combustor according to claim 1, wherein a slit is formed in each of said bridge bodies such that the slit extends in the bridging direction in the center of the bridge body with respect to the direction of width.

7. The gas turbine combustor according to claim 1, wherein each of said bridge bodies is constructed from at least three bridge branching parts that extend radially from the center of the cross section of said outlet port of said pre-mixture injection tube.

8. The gas turbine combustor according to claim 1, wherein said combustion chamber has a dome wall part to which said burners are attached, and a tubular wall part that extends downstream from said dome wall part, and said pre-mixture injection tubes are attached in said dome wall part in a state in which the pre-mixture injection tubes are substantially parallel to said burners, and said outlet ports of the pre-mixture injection tubes open at points further downstream than said discharge ports of said burners.

9. The gas turbine combustor according to claim 1, wherein said combustion chamber has a dome wall part to which said burners are attached, and a tubular wall part that extends downstream from said dome wall part, and said pre-mixture injection tubes are attached in said tubular part in a state in which the pre-mixture injection tubes are inclined with respect to said burners, and said outlet ports of the pre-mixture injection tubes open at points further downstream than said discharge ports of said burners.

10. The gas turbine combustor according to claim 1, wherein said combustion chamber has a dome wall part comprising a base end portion and an expanded portion on the upstream side, and a tubular wall part that extends downstream from said dome wall part, said burners are attached to said expanded portion, and said pre-mixture injection tubes are attached in said base end portion in a state in which said outlet ports of the pre-mixture injection tubes open at points further downstream than said discharge ports of said burners.

11. The gas turbine combustor according to claim 1, wherein said burners are disposed at intervals in the circumferential direction, and one or a plurality of said pre-mixture injection tubes are disposed between adjacent burners.

* * * * *